INVENTORS
ROBERT Z. HAGUE
KENNETH D. GARNJOST
CONRAD C. TREFF
WILLIAM C. MOOG, JR.

BY Popp and Sommer
ATTORNEYS.

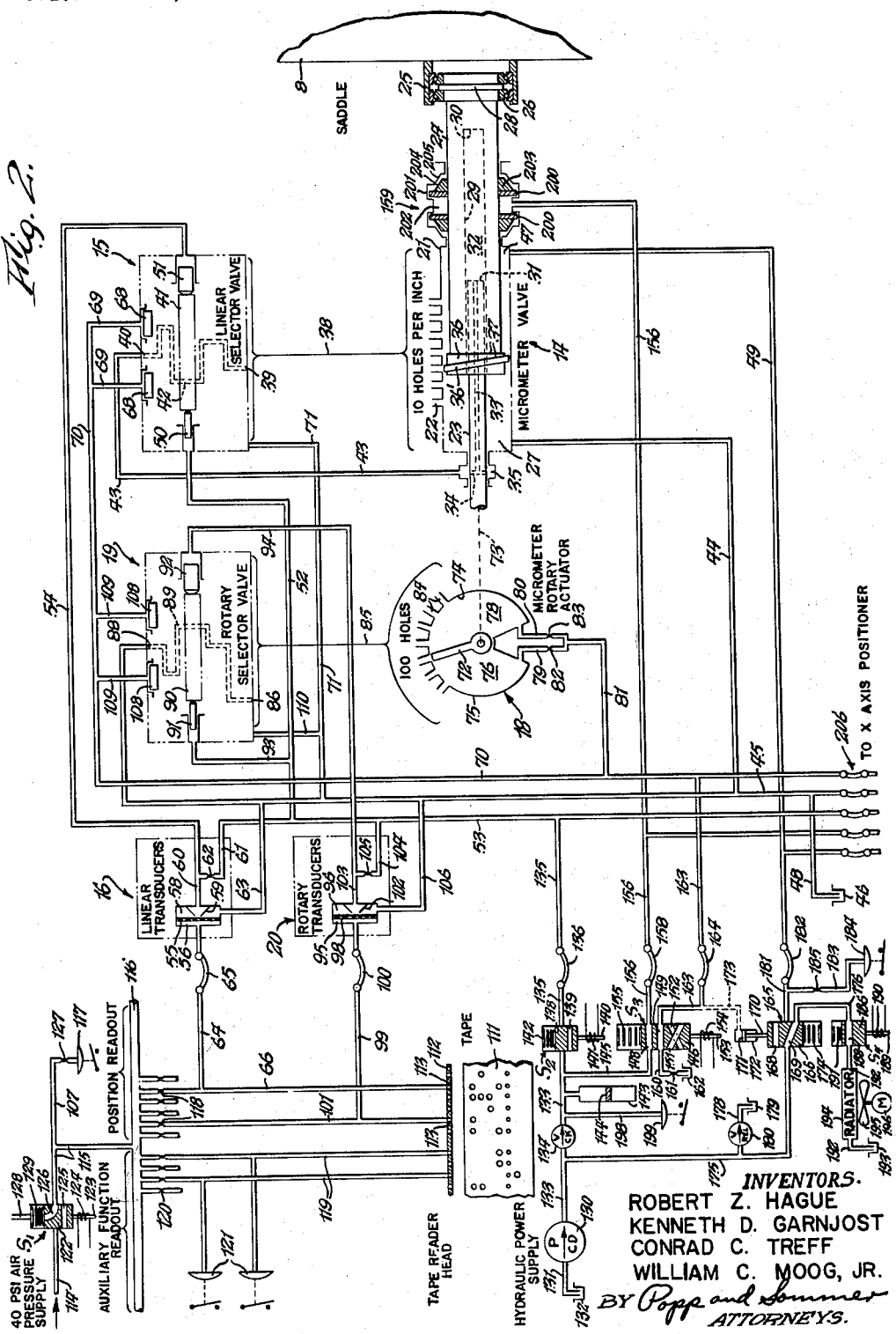

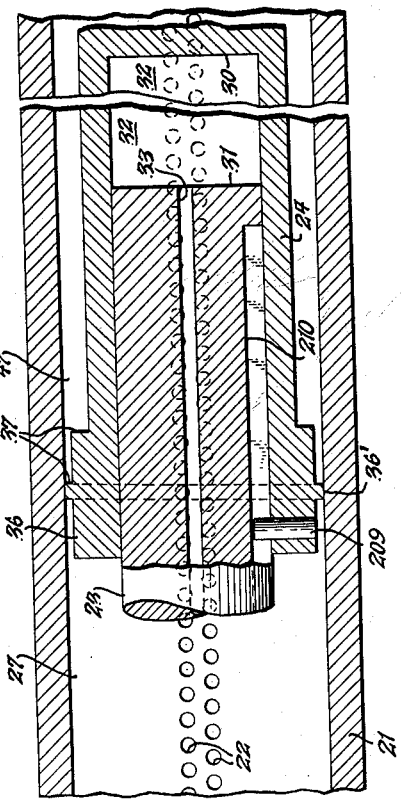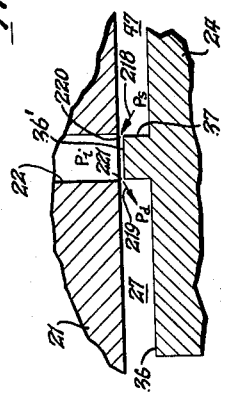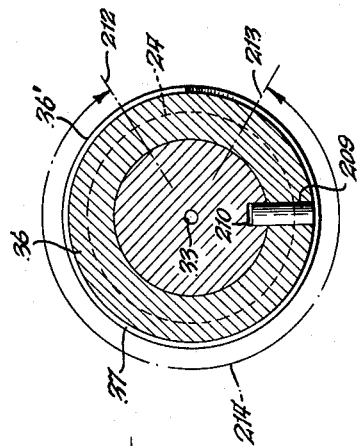

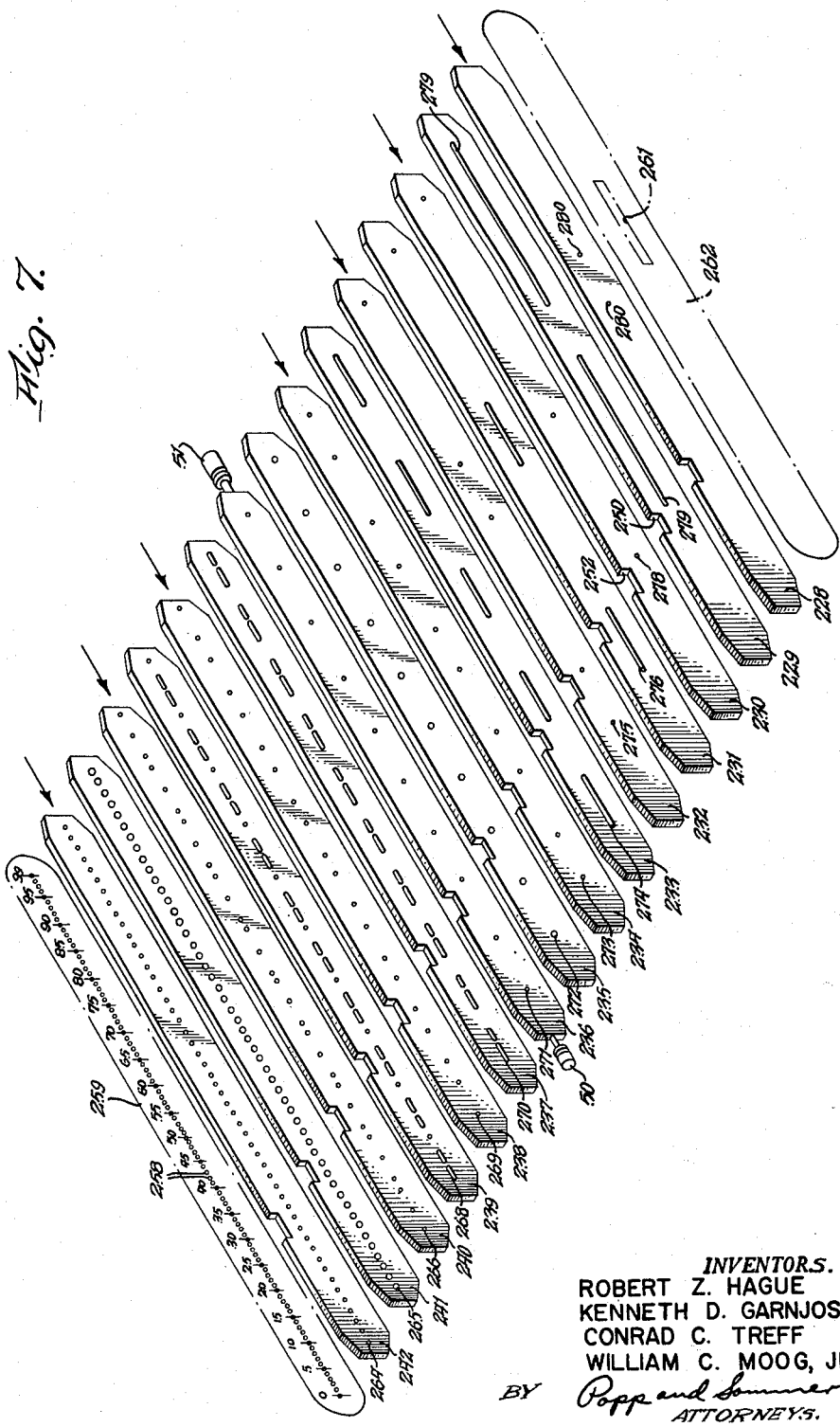

March 23, 1965   R. Z. HAGUE ETAL   3,174,406
POSITIONER
Filed March 6, 1961   11 Sheets-Sheet 5
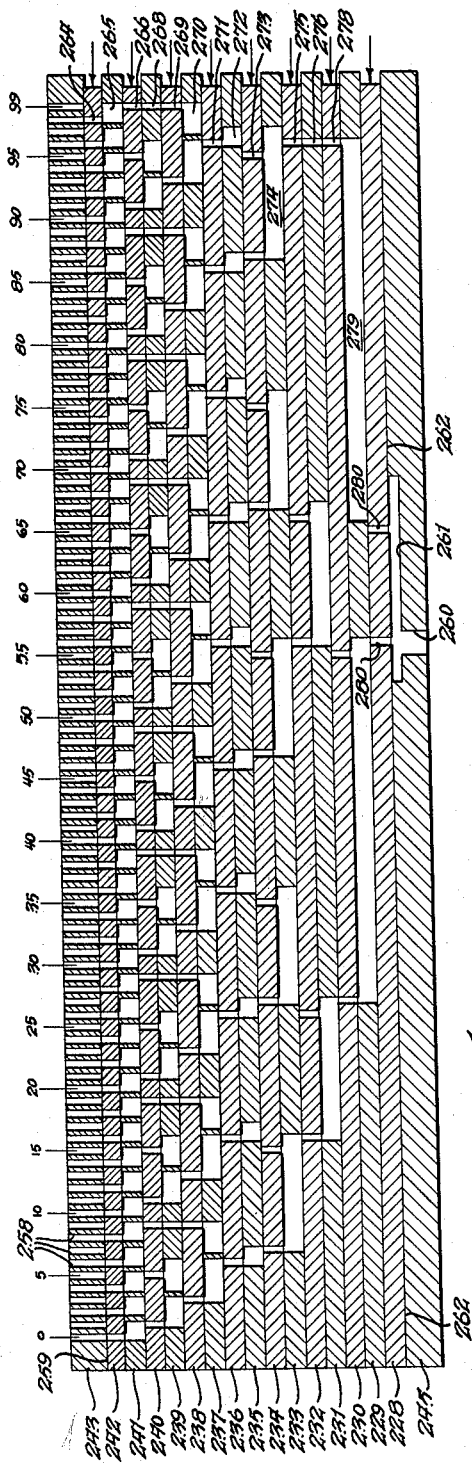
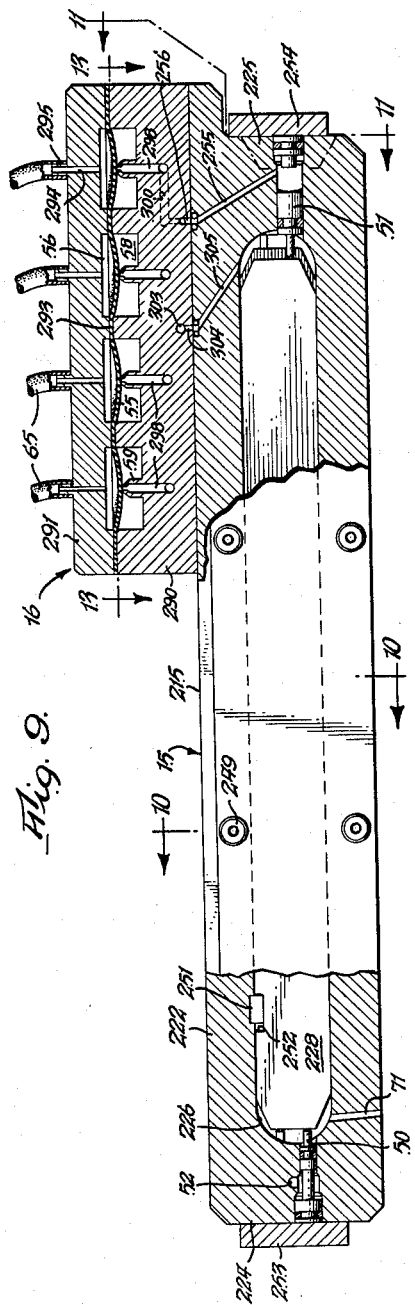
INVENTORS
ROBERT Z. HAGUE
KENNETH D. GARNJOST
CONRAD C. TREFF
WILLIAM C. MOOG, JR.
BY Popp and Sommer
ATTORNEYS March 23, 1965  R. Z. HAGUE ETAL  3,174,406
POSITIONER
Filed March 6, 1961  11 Sheets-Sheet 6
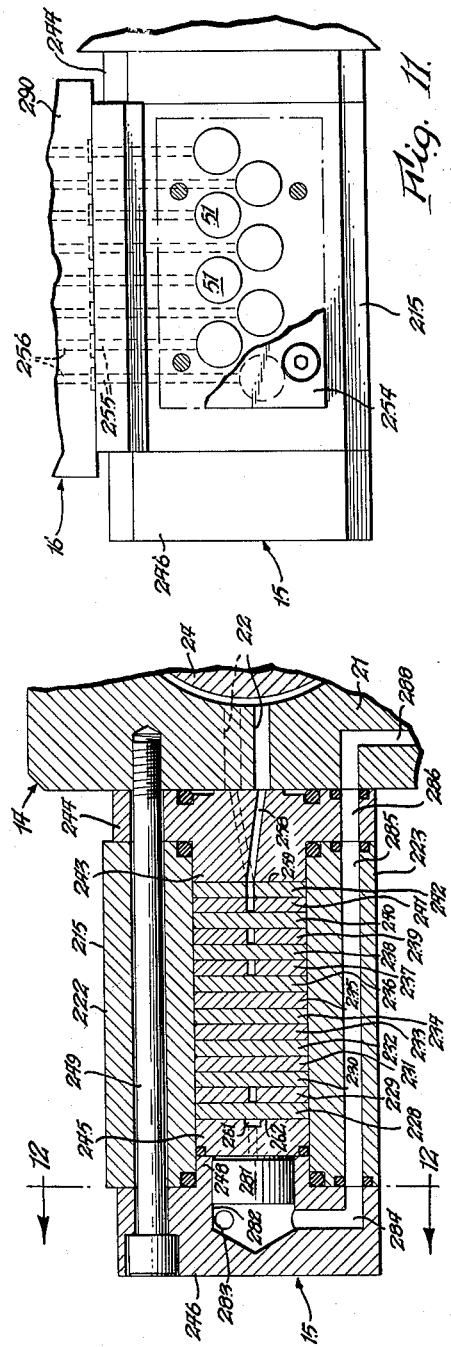
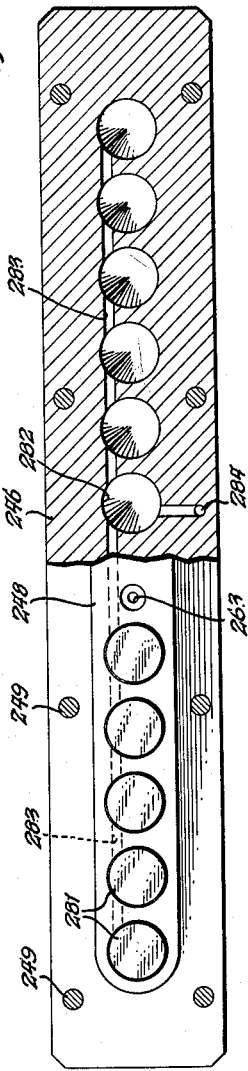
INVENTORS
ROBERT Z. HAGUE
KENNETH D. GARNJOST
CONRAD C. TREFF
WILLIAM C. MOOG, JR.
BY *Popp and Sommer*
ATTORNEYS.

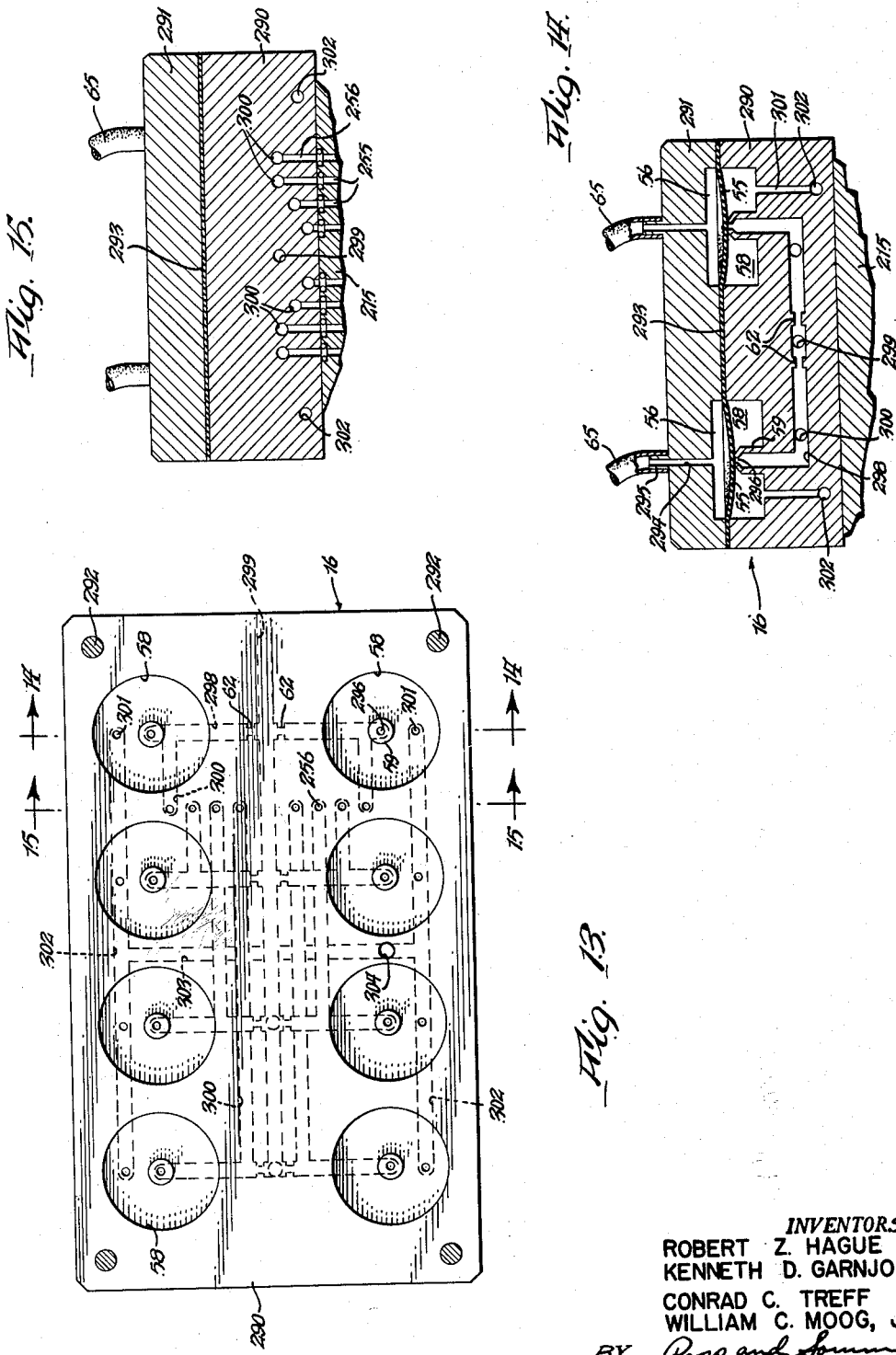

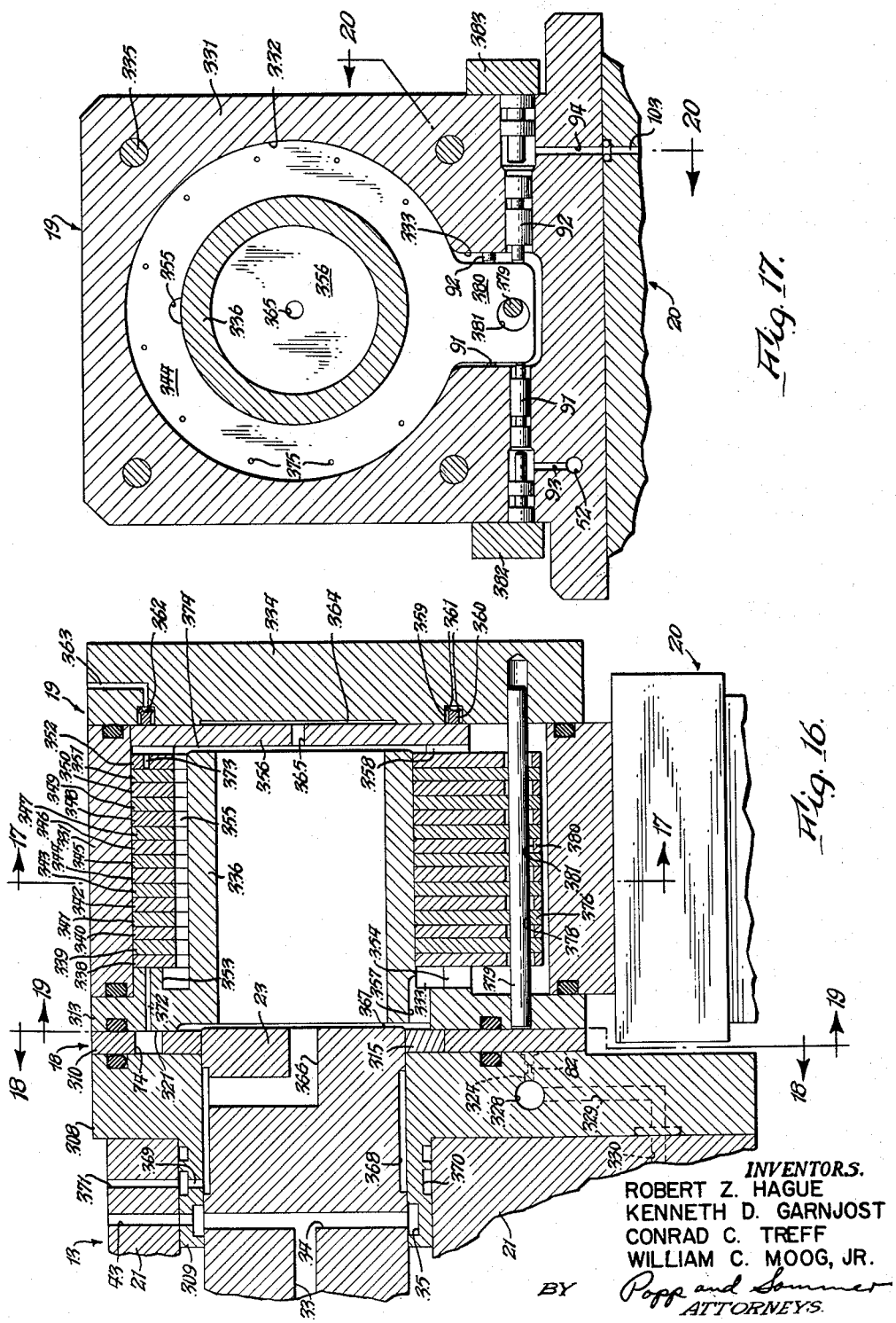

March 23, 1965 R. Z. HAGUE ETAL 3,174,406
POSITIONER
Filed March 6, 1961 11 Sheets-Sheet 9

INVENTORS
ROBERT Z. HAGUE
KENNETH D. GARNJOST
CONRAD C. TREFF
WILLIAM C. MOOG, JR.
BY *Popp and Sommer*
ATTORNEYS.

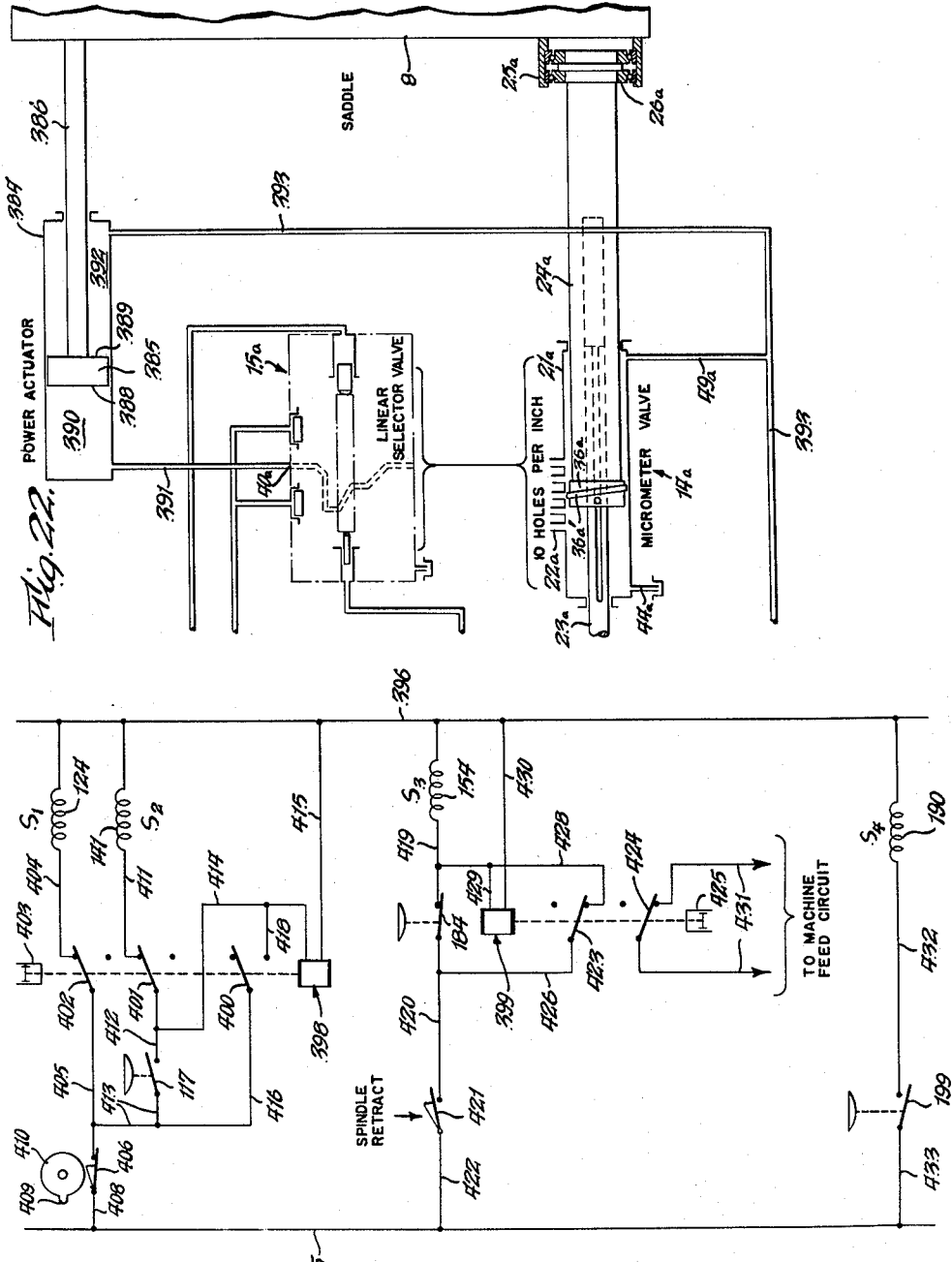

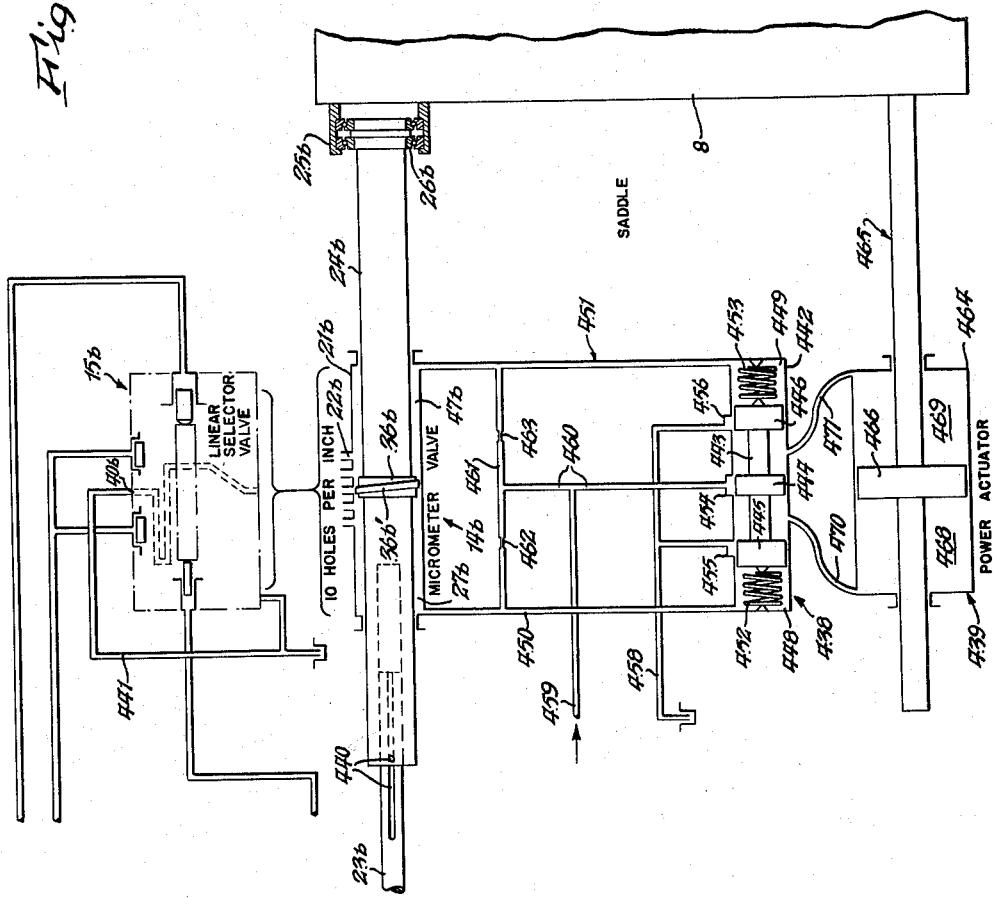

3,174,406
POSITIONER
Robert Z. Hague, Oradell, N.J., Kenneth D. Garnjost, West Falls, N.Y., Conrad C. Treff, New Milford, N.J., and William C. Moog, Jr., East Aurora, N.Y., assignors to Moog Servocontrols, Inc., East Aurora, N.Y., a corporation of New York
Filed Mar. 6, 1961, Ser. No. 93,483
23 Claims. (Cl. 91—19)

This invention relates to a positioner and more particularly to a digital-to-analog positioner capable of moving a member from point to point.

As a broad class, digital-to-analog positioners for machine tools are known, but until the advent of the present invention, prior art positioners have involved complex electronic circuitry.

The primary object of the present invention is to provide such a positioner which does not involve the use of electronics. Positioning of the movable member is accomplished entirely through the use of pneumatic and hydraulic components with no dependence upon electronic circuitry.

Ancillary advantages of the improved positioner are its simplicity, reliability, low original investment and maintenance costs, accuracy with a high level of repeatability, and compatability with known systems for storing digital information such as punched tape.

Other objects and advantages of the invention will be apparent from the following detailed description of preferred and modified embodiments shown in the accompanying drawings wherein:

FIG. 2 is a diagrammatic layout of a preferred construction of pneumatic and hydraulic apparatus for positioning one of the movable members supporting the workpiece shown in FIG. 1.

FIG. 3 is an enlarged fragmentary central longitudinal sectional view of the micrometer valve assembly illustrated in the diagram of FIG. 2.

FIG. 3A is a still further enlarged fragmentary view of the left-hand portion of the apparatus illustrated in FIG. 3 and showing the spacing of the gage point ports in the cylinder and their relation to the angle of the helical valving land on the piston head.

FIG. 4 is a fragmentary elevational view of the telescoped rod members shown in FIG. 3 and illustrating the half of the piston head with its valving land not apparent in FIG. 3.

FIG. 5 is a vertical transverse sectional view thereof taken on line 5—5 of FIG. 4.

FIG. 6 is an enlarged fragmentary central longitudinal sectional view of the piston head and cylinder shown in FIG. 4 and illustrating in an exaggerated manner the relation of the helical valving land to one of the gage point ports in the cylinder.

FIG. 7 is an exploded view of the commutator and switch plates which are components of the linear selector valve assembly shown in the diagram of FIG. 2.

FIG. 8 is a diagrammatic layout of the relationship of the various commutator and switch plates shown in FIG. 7.

FIG. 9 is a vertical longitudinal sectional view of the linear selector valve and linear transducer assemblies shown in FIGS. 1 and 2, a central portion of the valve assembly being illustrated in elevation.

FIG. 10 is an enlarged vertical transverse sectional view of the linear selector valve assembly and taken on line 10—10 of FIG. 9.

FIG. 11 is an enlarged partial vertical sectional view thereof taken on line 11—11 of FIG. 9.

FIG. 12 is a vertical longitudinal sectional view thereof on a reduced scale, taken generally on line 12—12 of FIG. 10, and showing a portion broken away to reveal hidden structure.

FIG. 13 is an enlarged horizontal sectional view of the linear transducer assembly and showing a top plan view of the lower body member thereof, the view being taken on line 13—13 of FIG. 9.

FIGS. 14 and 15 are each a vertical transverse sectional view thereof and showing the upper body member and intermediate diaphragm sheet applied to the lower body member, these views being taken on the correspondingly numbered lines of FIG. 13.

FIG. 16 is an enlarged vertical central longitudinal sectional view of the rotary selector valve assembly shown in FIGS. 1 and 2, this view being taken generally on line 16—16 of FIG. 1.

FIGS. 17, 18 and 19 are each a vertical transverse sectional view thereof taken on the correspondingly numbered lines of FIG. 16.

FIG. 21 is a wiring diagram of the electrical circuit for the various solenoid valves shown in the diagram of FIG. 2.

FIG. 22 is a partial diagrammatic layout, similar to the right-hand portion of FIG. 2, of a modified construction of positioner, characterized by providing the hydraulic fluid-operated actuator means separate from the micrometer valve assembly.

FIG. 23 is a partial diagrammatic layout, similar to the right-hand portion of FIG. 2, of still another modified construction of positioner, characterized by utilizing the micrometer valve assembly as a first stage pilot valve for a second stage servovalve controlling fluid flow with respect to a separate power actuator means.

DESCRIPTION OF MACHINE TOOL

Figure 1:
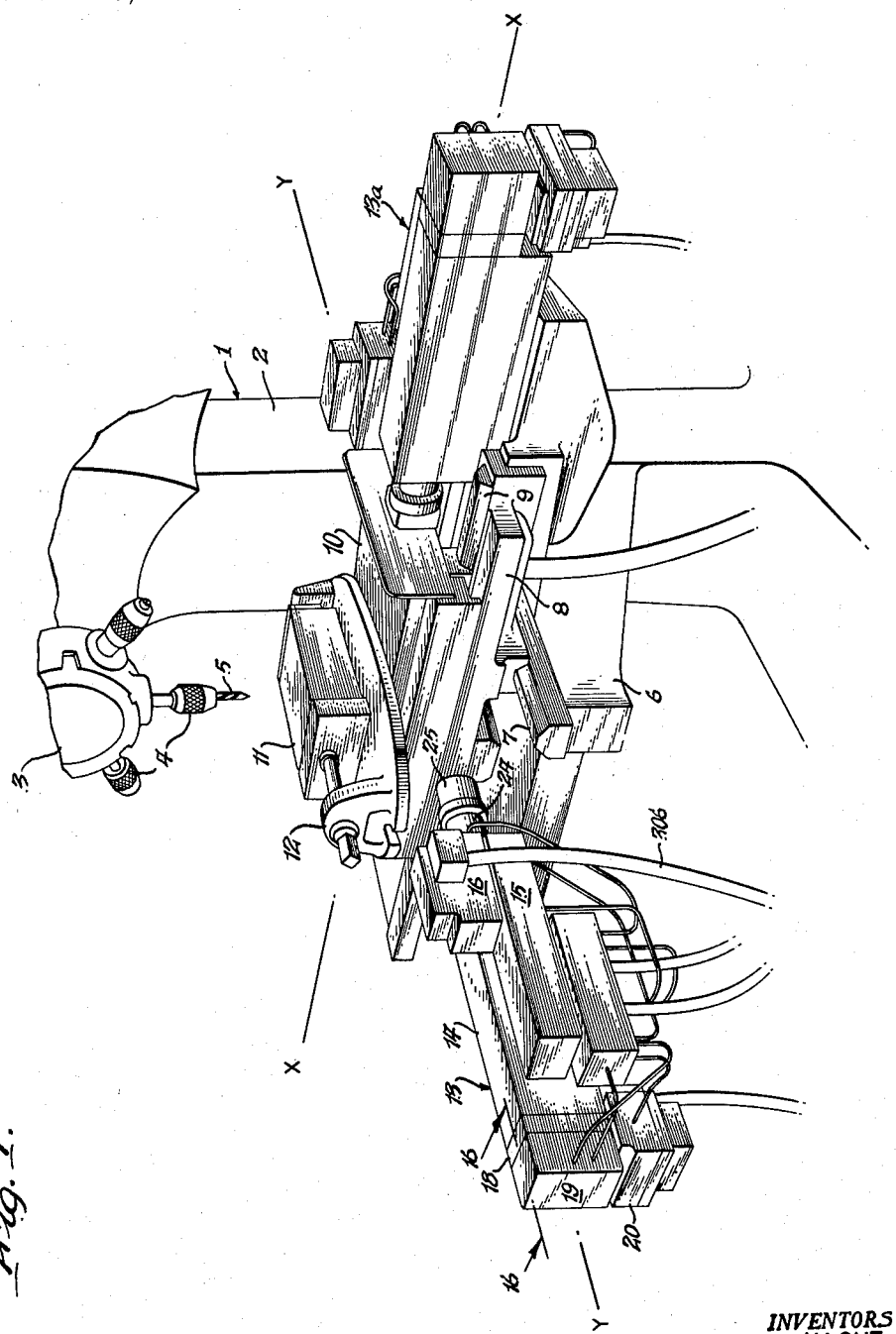
FIG. 1 is a fragmentary, perspective view of a machine tool equipped with pneumatic and hydraulic apparatus constructed in accordance with the principles of the present invention for positioning a workpiece.

The machine tool generally designated 1 in FIG. 1 is shown as having an upright frame portion or column 2 on the upper portion of which there is vertically slidably arranged a turret head 3, also rotatable about a horizontal axis, so as to move into a vertical downwardly projecting position any desired one of a series of chucks 4 severally adapted to hold a cutting tool such as a drill bit indicated at 5. Positioned below the turret head 3 and extending laterally from the column 2 is a stationary arm or bed 6. The upper surface of this bed 6 is formed to provide a pair of horizontal and spaced ways 7, only one of which is illustrated in FIG. 1. The ways 7 are parallel to each other and also to a horizontal axis Y.

Sliding on the ways 7 in a direction along the Y axis is a saddle member 8. The upper surface of the saddle member 8 is provided with a pair of spaced and horizontal ways 9 only one of which is shown in FIG. 1. The ways 9 are parallel to each other and to a horizontal axis X.

Sliding on the ways 9 in a direction along the X axis is a table member 10. A workpiece 11 is shown as held to the table member 10 by a fixture 12 suitably bolted to the table member.

As is well known, it will be seen that by moving the saddle member 8 along the Y axis a predetermined distance from a reference point and also moving the table member 10 along the X axis another predetermined distance from a reference point, the workpiece 11 can be moved to a new location or resultant point with respect to the vertical operating axis of the tool bit 5.

GENERAL DESCRIPTION OF POSITIONER

The purpose of the present invention is to provide a positioner indicated generally at 13 in FIG. 1 for operative interposition between the machine bed 6 and saddle member 8 for positioning this saddle member along the Y axis, and also to provide a similar positioner 13a for operative interposition between the saddle member 8 and table member 10 for positioning this table member along the X axis. The positioner 13 is suitably supported on the machine bed 6, and the positioner 13a is suitably supported on the saddle member 8.

A description of one of the positioners 13, 13a will suffice because both are essentially the same in construction and operation. The positioner 13 for controlling motion of the saddle member 8 along the Y axis will be described.

Subassemblies of the positioner 13 can be identified in FIG. 1 and these subassemblies are diagrammed in FIG. 2 and illustrated in detail elsewhere in the figures of the drawings. Referring to FIG. 1, these subassemblies include a micrometer valve assembly 14, a linear selector valve assembly 15, a linear transducer assembly 16, a micrometer valve rotary actuator assembly 18, a rotary selector valve assembly 19, and a rotary transducer assembly 20.

Referring to FIG. 2, the micrometer valve assembly 14 is shown as having a valve body or cylinder 21, the wall of which is provided with a series of gage point ports 22, and a pair of telescoped inner and outer rod members 23 and 24, respectively. The outer rod member 24 is shown as extending outwardly through the right-hand end wall of the cylinder 21 and at its outer end is suitably connected to the saddle member 8 to move rectilinearly therewith but permitting relative, rotative movement therebetween. For this purpose, the saddle member 8 is shown as having a tubular extension 25 which holds the outer races of an anti-friction type thrust bearing 26, the inner races of which are arranged on opposite sides of a radially outwardly projecting annular flange 28 suitably fast to the outer end of the rod 24. Thus, when the saddle member 8 moves along the axis Y, the outer rod member 24 moves axially of the cylinder 21, even though this rod member is free to rotate about its central longitudinal axis and relative to the non-rotatively arranged saddle member. The outer rod member is shown as provided with a cylindrical recess 29 which has an end wall 30 at one end and opens to the inner end face of this rod member at its opposite end.

The inner rod member 23 is rotatable but axially immobile. The inner end portion of the inner rod member 23 is received within the recess 29. The rod members 23 and 24 have relative axial movement but are constrained to rotate together about their common longitudinal axis. The inner end face 31 of the inserted end portion of the inner rod member 23 opposes the end wall 30 so that the portion of the recess 29 between this end face and end wall provides an actuator chamber 32. The outer end portion of the inner rod member 23 projects outwardly through the left-hand end wall of the cylinder 21 and is suitably operatively associated with the micrometer valve rotary actuator assembly 18 explained later herein.

The inner rod member 23 does not move axially relative to the cylinder 21 but the outer rod member slides thereon. When the inner rod member 23 rotates, it compels rotation of the outer rod member 24. A passage 33 is provided centrally in the inner rod member 23 and is shown as extending from the end face 31 thereof to a point external of the cylinder 21 where it terminates in a diametral or transverse passage 34 which places actuator chamber 32 via the longitudinal passage 33 in fluid conducting relation with an annular chamber 35 arranged adjacent the end of the cylinder 21.

The gage point ports 22 comprises a series of holes shown as circular and of uniform diameter and provided at uniformly spaced axial intervals in the wall of the cylinder 21. Arranged within the cylinder 21 and carried by the inner end of the outer rod member 24 for operative association with the ports 22, is a piston head 36 shown as formed peripherally with a helical valving land 36', although this land may be otherwise suitably shaped. This helical valving land 36' has a lead through its effective arcuate extent or length corresponding to the center-to-center spacing of the gage point ports 22 and a width corresponding to the diameter of one of the ports 22 so that, generally speaking, the land can close only one of the ports 22 at a given time. The side or end face of the piston head 36 which faces axially toward the saddle member 8 is designated 37. The area of the end wall 30 of the actuator chamber 32 is preferably twice that of the piston end face 37.

The center-to-center spacing of the gage point ports 22 may be any desired amount but for a purpose which will become clear later on, it is preferred to provide ten such ports or holes per inch so that the center-to-center spacing interval is 1/10 of an inch. Such center-to-center spacing interval is represented at A in FIG. 3A.

The gage point ports 22 are severally connected via individual conduits or passages represented in FIG. 2 by the composite line 38 with the linear selector valve assembly 15. On one side, this valve has a port or hole for each of the gage point ports 22, one such port being indicated at 39 in FIG. 2. On its other side, the linear selector valve assembly has a single port indicated at 40 in FIG. 2. Intermediate the ports 39 and 40 are a series of switch plates one of which is indicated at 41 in FIG. 2. This switch plate is provided with one or more transverse passages such as indicated at 42 in FIG. 2. The various switch plates are relatively movable by means hereinafter described so as to establish a flow path between the single port 40 and one of the ports 39. Such a typical flow path including the portion 42 is represented by broken lines in FIG. 2.

The purpose of the linear selector valve assembly 15 is to place the desired one of the gage point ports 22 in fluid conducting communication with the actuator chamber 32, via the conduit 38, selective port 39, selective flow path through the linear selector valve plates such as 41, through the single port 40, and through a conduit or line 43 which connects the single port 40 to the annular chamber 35. It will be understood that no matter what the combination of switch plate positions, only one gage point port 22 will be placed in communication with the single port 40, the other gage point ports 22 being closed.

Referring again to the micrometer valve assembly 14 shown in FIG. 2, the left-hand end portion 27 of the cylinder chamber to the left of the piston head 36 is connected via a branch line or conduit 44 to a main line or conduit 45 which in turn is connected to a fluid drain 46 via a branch line or conduit 48. The other or right-hand end portion 47 of the cylinder chamber to the right of the piston head 36 is connected to a supply of hydraulic fluid under pressure via a line 49.

Adverting again to the linear selector valve assembly 15, each of the switch plates such as the one 41 illustrated in FIG. 2, is rectilinearly movable. Any suitable means may be employed to effect this rectilinear movement. As shown, the typical switch plate 41 is urged to move as to the right by a piston 50 and to the left by a second piston 51, both these pistons being operated by hydraulic fluid. The piston 51 has a larger effective area than has the piston 50 so that when both pistons are subjected to fluid under the same pressure, the force exerted by the larger piston 51 will overcome that exerted by the smaller piston 50 and thereby shift the switch plate 41 from right to left as viewed in FIG. 2. The fluid working the small piston 50 is supplied via a branch line or conduit 52 which communicates with a main line or conduit 53. The fluid working the large piston 51 is supplied via a line or conduit 54 which leads to the linear transducer assembly 16.

A single pneumatic to hydraulic transducer is associated with each large piston 51 operating a switch plate of the linear selector valve assembly 15. As illustrated diagrammatically in FIG. 2, the linear transducer for the large piston 51 is shown as comprising a diaphragm 55 separating a pneumatic chamber 56 on one side and a hydraulic fluid chamber 5 on the opposite side. In the chamber 58 is arranged a nozzle 59 against which the diaphragm 55 is adapted to seat and close off the nozzle aperture. This nozzle aperture is in fluid conducting relation with the line 54 via a branch line or conduit 60. Hydraulic fluid under pressure is supplied to branch line 60 via another branch line or conduit 61 connected to the main fluid supply line 53. A restriction 62 is provided in the branch line 61 so that flow through this restriction will produce a pressure drop on the downstream side thereof. The hydraulic fluid chamber 58 of the transducer connects with the main fluid drain line 45 via a branch line or conduit 63.

Assuming that the pressure of the pneumatic fluid in the chamber 56 is below a predetermined level, then the pressure of the hydraulic fluid in the chamber 58 will hold the diaphragm 55 out of engagement with the tip of the nozzle 59. Accordingly, hydraulic fluid flows from the main supply line 53 via the branch line 61, the restriction 62 therein, the branch line 60, the aperture of the nozzle 59, the chamber 58 and the branch line 63 into the main fluid drain line 45. Under these conditions, a sufficient fluid pressure cannot be built up behind the large piston 51 to develop a force to overcome that exerted by the small piston 50. However, if the pneumatic pressure in the chamber 56 rises above a predetermined level, the diaphragm 55 closes the aperture of the nozzle 59, thereby destroying communication between the supply branch 61 and the drain branch 63. In this situation, the fluid being supplied through the branch line 61 now moves into the line 54 which leads to the large piston 51. This will permit the large piston 51 to exert a force against the switch plate 41 which is larger than that exerted by the small piston 50 so as to cause this switch plate to shift to the left as viewed in FIG. 2.

Each pneumatic chamber 56 of the various pneumatic to hydraulic transducers in the linear transducer assembly 16 is associated via a line or conduit 64 including a flexible section 65 therein to a companion pneumatic chamber 66 associated with a tape reader to be explained later herein.

The various valve plates of the linear selector valve assembly 15 are adapted to be clamped together to prevent relative shifting and reduce leakage therebetween. For this purpose, clamp pistons or plungers, two of which are shown at 68 in FIG. 2, are severally connected via branch lines or conduits 69 to a second main hydraulic fluid supply line or conduit 70. These plungers 68 are maintained in an inoperative or unclamped position while the switch plates, as typified by the plate 41, are shifted. However, when fluid is flowing through the linear selector valve assembly 15, the plungers 68 are in an operative or clamped condition whereby the various switch plates, such as the one 41, are clamped together to minimize fluid leakage therebetween. Any leakage that does occur is led to the main fluid drain line 45 via a branch drain line or conduit 71.

Briefly summarized at this point, it will be seen that a selective actuation or deactuation of the various diaphragms 55 of the linear transducer assembly 16 will determine which one of the gage point ports 22 will be placed in fluid conducting communication with the single port 40 of the linear selector valve assembly 15 and thereby determine which one of these ports 22 will be in fluid conducting communication with the actuator chamber 32. This controls the axial position of the outer rod member 24 and the helical piston head 36 with the valving land 36′ thereon and hence controls the rectilinear motion of the saddle member 8.

Adverting again to the inner rod member 23, the outer end thereof is operatively associated with the rotary actuator assembly 18 to control rotation of this rod member. Since the outer rod member 24 is compelled to rotate with the inner rod member 23, it will be seen that rotation of the piston head 36 will be controlled by actuation of the rotary actuator assembly 18. This assembly includes a vane 72 fast to the outer end of the inner rod member 23 as represented by the interrupted line 73. The vane 72 works in an arcuate compartment 74 suitably formed in a body member 75. The vane 72 is arranged radially of the arcuate compartment 74 and divides the same into two chambers 76 and 78. Hydraulic fluid is supplied to the chambers 76 and 78 via branch lines or conduits 79 and 80, respectively, joined together into a common branch line or conduit 81 which connects with the second main hydraulic fluid supply line 70. The branch lines 79 and 80 are shown as having restrictions 82 and 83, respectively, therein. A wall of the rotary actuator body 75 defining the arcuate compartment 74 is provided with a series of circumferentially spaced holes or ports 84. While the number of these ports 84 may be as desired, it is preferred to proivde one hundred such holes or ports 84 of circular form and uniform diameter and at uniformly spaced intervals throughout the effective arcuate extent of movement of the vane 72.

At this point, it will be noted that the lead of the helical valving land 36′ corresponds to the center-to-center spacing A (FIG. 3A) of a pair of adjacent gage point ports 22 and is determined over the circumferential extent or length corresponding to that effectively provided for arcuate movement of the vane 72.

If the vane 72 can be moved to the desired one of the ports 84, the inner rod 23 and hence the piston head 36 with its helical valving land 36′ on the outer rod member 24, can be moved through the desired angular increment to cause a portion of this valving land to move axially of the cylinder 21 with respect to any given gage point port 22 in the cylinder wall.

Means generally similar to those described for the gage point ports 22 are provided for the rotary actuator ports 84 for selectively venting the desired one of such ports 84 to drain. The one hundred ports 84 are severally connected by lines or conduits represented by the composite line 85 to one hundred ports provided on one side of the rotary selector valve assembly 19, as typified by the port 86. The rotary selector valve assembly 19 is illustrated in FIG. 2 as similar to the linear selector valve assembly 15, although the assembly 19 as described in detail later herein is actually different in construction. A single port 88 exists on the opposite side of the rotary selector valve 19 and this port can be connected with any of the one hundred ports on the other side, such as the port 86, via a flow course represented by broken lines 89 having portions passing through various of the rotary valve plates, such as typified by the one marked 90. This typical rotary valve plate 90 is urged to move in one direction, or to the right as viewed in FIG. 2, by a small piston 91, and in the opposite direction or to the left by a large piston 92. Hydraulic fluid is applied to the small piston 91 via a line or conduit 93 which communicates with the branch line 52 leading from the main fluid supply line 53.

Hydraulic fluid is applied to the large piston 92 via a branch line or conduit 94 which leads to a pneumatic to hydraulic transducer included in the rotary transducer assembly 20. Such transducers include typically two chambers 95 and 96 separated by a diaphragm 98. The pneumatic chamber 95 is connected by a line or conduit 99 including a flexible section 100 therein to a pneumatic fluid chamber 101 forming part of the tape reader. A nozzle 102 is arranged in the hydraulic fluid chamber 96 and has an aperture adapted to be closed by the diaphragm 98 when urged thereagainst by the pressure of the pneumatic fluid in the chamber 95 when above a predetermined level. The nozzle 102 is internally connected via a branch line or conduit 103 to the line 94 leading to the large piston 92. Hydraulic fluid under pressure is supplied to the branch line 103 via a branch line or conduit 104 extending from the main fluid supply line 53. A restriction 105 is arranged in the branch supply line 104. A branch drain line or conduit 106 places the hydraulic fluid chamber 96 externally of the nozzle 102 in constant fluid communication with the main drain line 45.

As with the linear selector valve assembly 15, the rotary selector valve assembly 19 includes valve plate clamping means represented in FIG. 2 by a pair of clamping pistons or plungers 108 severally connected via branch lines or conduits 109 to the main fluid supply line 70.

Here briefly summarizing the operation of the micrometer valve rotary actuator assembly 18 and the rotary selector valve assembly 19 and the rotary transducer assembly 20 operatively interposed therebetween, when the pneumatic pressure in the chamber 95 rises to a predetermined level, the diaphragm 98 closes the aperture of the nozzle 102 thereby closing or destroying the fluid conducting connection between the branch supply line 104 and the branch drain line 106. With the diaphragm 98 seated, the fluid under pressure is diverted into the branch line 94 to work against the large piston 92, thereby shifting the switch plate 90 to the left. If the pneumatic pressure in the chamber 95 is below this operative predetermined level, the aperture of the nozzle 102 is uncovered and the supply of hydraulic fluid under pressure is shunted to drain via the branch drain line 106.

It will also be noted that the clamping pistons or plungers 108 of the rotary selector valve assembly 19 are operated simultaneously with the clamping pistons or plungers 68 of the linear selector valve assembly 15. Any leakage occurring between the plates such as represented by the one 90 in the rotary selector valve assembly 19 is conducted to drain via a branch line or conduit 110 which communicates with the branch drain line 71.

While any suitable means may be provided for selectively operating the linear and rotary transducer assemblies 16 and 20, respectively, the means shown are pneumatic and are under the ultimate control of a punched tape 111 which may be conventional one-inch, 8-channel punched tape on which the digital information is stored in binary coded decimal form. As is well known, a block of information represented on the tape 111 by the pattern or array of holes in a given length thereof, can be read when this tape is placed against a tape reader head represented by the number 112 in FIG. 2. This head 112 has a plurality of holes 113 therein which severally communicate with tubes which provide pneumatic chambers such as the chambers 66 and 101 filled with pneumatic fluid, the pressure of which is controlled by whether or not a hole in the tape 111 is opposite the hole 113 for the corresponding tube. The absence of a hole in the tape will allow the pressure of pneumatic fluid in the respective reader tube to build up, whereas the presence of a hole in the tape will render pressure build-up impossible, as will be explained immediately herebelow.

Pneumatic fluid under pressure is supplied to the tubes such as those represented at 66 and 101 from any suitable source (not shown). For the example illustrated and described, it may be assumed that compressed air at a pressure of 40 p.s.i is supplied through an air supply line 114 which leads to a solenoid valve $S_1$. From this solenoid valve $S_1$ a supply line or conduit 115 leads to a manifold 116. A pressure switch 117 is connected to the supply line 115 via a branch line or conduit 107 having a restriction 127 therein.

It is from this manifold 116 that the various tubes, such as those represented by 66 and 101 extend. Each of the tubes such as 66 and 101 has a restriction 118 therein so that when there is flow through this restriction, a drop in pressure occurs on the downstream side thereof.

Similar tubes 119 for controlling machine tool operations such as tool selection, feed and speed, are provided which have restrictions 120 therein and extend between the air manifold 116 and the tape reader head 112. Pressure sensitive switches such as indicated at 121 may be operatively associated with the lines 119 severally controlling machine electrical circuits for this purpose.

Adverting to the solenoid valve $S_1$, the same is shown diagrammatically in FIG. 2 as having a valve slide 122 connected to an armature 123 surrounded by a coil 124. The valve slide 122 is shown as having a through passage 125 and an elbow passage 126 which is always in communication with a vent 128. When the valve $S_1$ is in a deenergized position as shown its valve slide 122 is in its lower position, held there by the return spring 129, and the line 115 is placed in communication with the vent 128, thereby blocking off the air supply in the line 114. When the valve $S_1$ is energized, the valve slide 122 moves upwardly to bring the through passage 125 into a position opposite the lines 114 and 115 and place the same in communication with each other.

The means for supplying hydraulic fluid under pressure to the various hydraulic fluid operated devices, are now to be described. A fixed displacement or constant delivery pump 130 preferably of the vane type and driven preferably by an electric motor, has its inlet connected via an inlet line or conduit 131 associated with a fluid drain 132. The outlet of the pump 130 is connected to an outlet line or conduit 133. This outlet line is shown as having a check valve 134 therein and leads to a solenoid valve $S_2$. The downstream side of this solenoid valve $S_2$ is connected to a fluid supply line or conduit 135 which leads to and has fluid communication with the main fluid supply line 53. The line 135 is shown as having a flexible section 136 therein.

The solenoid valve $S_2$ comprises a valve slide 138 having a through passage 139 therein and connected to an armature 140 surrounded by a coil 141. In the deenergized position of the solenoid valve $S_2$ shown in FIG. 2 and in which the valve slide 138 is urged downwardly by a return spring 142, communication between the lines 133 and 135 is blocked by the valve slide 138. However, when the solenoid valve $S_2$ is energized, the valve slide 138 moves upwardly to bring the through passage 139 opposite the lines 133 and 135 and place the same in communication with each other.

Intermediate the check valve 134 and solenoid valve $S_2$, an accumulator 143 having a floating piston 144 therein, is operatively associated with the line 133. Thus, the check valve 134 and accumulator 143 cooperate to provide a source of hydraulic fluid under substantially constant pressure to be admitted into the fluid supply line 135 under control of the solenoid valve $S_2$.

Intermediate the accumulator 143 and solenoid valve $S_2$ a branch line or conduit 145 extends from the fluid supply line 133. This line 145 leads to a solenoid valve $S_3$. The solenoid valve $S_3$ includes a valve slide 146 having an upper through passage 148, an intermediate through passage 149, and a pair of lower inclined passages 151 and 152 which cross each other but do not intersect. This valve slide 146 is connected to an armature 153 surrounded by a coil 154. The valve slide 146 is urged by a return spring 155 to its downward position shown in FIG. 2. The solenoid valve $S_3$ is shown in its deenergized position in which the line 145 communicates via the upper through passage 148 with a line or conduit 156 having a flexible section 158 therein. The downstream end of the line 156 leads to a clamp device represented at 159 to be explained later herein. Also, when the solenoid valve $S_3$ is in its deenergized position as shown, the left-hand end of the intermediate through passage 149 connects with a line or conduit 160 having a restriction 161 therein and leading to a drain 162. The opposite or right-hand end of the intermediate through passage 149 is shown as communicating with a line or conduit 163 which leads to the main fluid supply line 70. The line 163 is shown as having a flexible section 164 therein. With the solenoid valve S₃ in a deenergized position, it will be seen that the line 70 is connected to the drain 162 via the branch line 163 intermediate through passage 149 and branch line 160. However, when the solenoid valve S₃ is energized, the upper and intermediate through passages 148 and 149, respectively, disconnect from the lines 145 and 160, and instead place supply line 145 in communication with line 163 via the cross passage 151 and place drain line 160 in communication with line 156 via the other cross passage 152. Thus, when the solenoid valve S₃ is energized, the line 156 will be connected to the drain 162 and the line 163 will be connected to the supply line 145.

An hydraulic fluid operated valve 165 is shown as operatively associated with the line 163 connected to the solenoid valve S₃. The valve 165 includes a valve slide 166 having an upper through passage 168 and a lower inclined through passage 169. The valve slide 166 is connected by a rod 170 to a piston 171 slidably arranged in a cylinder 172. A branch line or conduit 173 establishes communication between the portion of the cylinder 172 above the piston 171, with the line 163 associated with the solenoid valve S₃. The valve slide 166 is urged toward its upper position in which it is shown in FIG. 2 by a return spring 174. A line or conduit 175 establishes communication between the pump output line 133 on the upstream side of the check valve 134 therein with the left-hand end of the inclined through passage 169 of the hydraulically operated valve 165, as shown. When in this position, the opposite end of the inclined through passage 169 communicates with a line or conduit 176 which leads to a solenoid valve S₄. In a branch line or conduit 178 extending from the line 175 and leading to a drain 179, there is arranged a pressure relief valve 180.

When the hydraulically operated valve 165 is in the position shown in FIG. 2, communication of the line 175 on the upstream side of this valve is blocked with a line or conduit 181 which through a flexible section 182 communicates with the line 49. The line 181 is shown as conected via a branch line or conduit 183 with a pressure switch 184. The branch line 183 has a restriction 185 therein.

The solenoid valve S₄ is shown as including a valve slide 186 having a through passage 188 therein. An armature 189 connected to the valve slide 186 is surrounded by a coil 190. When the solenoid valve S₄ is deenergized as shown, the valve slide 186 is in its lower position and is urged there by a return spring 191. In this position, the line 176 coming from the hydraulically operated valve 165 communicates with the right-hand end of the through passage 188. The left-hand end of this through passage 188 communicates via a line or conduit 192 with a drain 193. For cooling the hydraulic fluid such as oil flowing through the line 192, a radiator 194 of any suitable construction is operatively arranged therein. Preferably air is blown through the radiator by a fan 195 driven by an electric motor 196.

Intermediate the check valve 134 and accumulator 143, the fluid supply line 133 communicates via a branch line or conduit 198 with a pressure switch 199.

The clamp device 159 which is hydraulically operated may be of any suitable construction. As shown, it comprises a pair of axially spaced ring pistons 200, 200 surrounding the outer rod member 24 and arranged in an extension 201 of the cylinder body 21 of the micrometer valve assembly 14. The fluid supply line 156 connects with a chamber 202 provided between the pistons 200. Axially outwardly of each of the pistons 200 and immediately adjacent thereto is a radially split wedge ring 203 having a frusto-conical working face 204 adapted to engage a stationary wedge face 205 formed suitably on the casing member 201. It will be seen that when fluid under pressure is introduced into the chamber 202 via the line 156, the pistons 200 are urged away from each other and in so moving force the split rings 203 against their respective cooperating wedge surfaces 202. The camming action between the surfaces 204 and 205 causes the elements of the split rings 203 to move radially inwardly to frictionally engage or clutch the peripheral surface of the outer rod member 24 so as to hold the same against axial displacement.

In an actual apparatus constructed according to the diagram of FIG. 2, it will be understood that the various drains 46, 132, 162, 179 and 193 are combined into a common sump or reservoir from which the pump 130 draws hydraulic fluid.

The hydraulic power supply described above is common to both the X and Y axis positioners 13, 13a. Accordingly, in FIG. 2, suitable connections as indicated generally at 206 are made to the hydraulic lines 49, 156, 53, 45 and 70 for the X axis positioner. Neither the compressed air source, the hydraulic power supply, nor the tape reader are illustrated in FIG. 1.

MICROMETER VALVE ASSEMBLY

A more detailed illustration of the relationship between the piston head 36 with its helical valving land 36' and the gage point ports 22 and between the inner and outer rod members 23 and 24, respectively, is shown in FIGS. 3–6. Referring to FIGS. 3 and 3A, the gage point ports 22 are circular holes of the same diameter and arranged in two longitudinal rows and staggered relatively to each other. The effective center-to-center spacing A of two adjacent holes 22 is 0.1 inch. The angle $\alpha$ shown in FIG. 3A is the helix angle or angle of the helical valving land 36'.

The means for preventing relative rotation between the inner and outer piston rod members 23 and 24, respectively, comprises a pin and slot type connection. As shown, the outer rod member 24 adjacent the piston head 36 carries a radially inwardly projecting pin 209. The inner end portion of this pin 209 is received in a longitudinally extending groove 210 provided in the outer face of the inner rod member 23 and recessed therefrom. This interengagement between the pin 209 and groove 210 permits relative longitudinal movement between the inner and outer rod members 23 and 24, respectively, but prevents relative rotation therebetween.

As has been previously stated, the lead of the helical valving land 36' through its effective arcuate extent or length, as determined by the limits of arcuate movement for the vane 72 of the micrometer valve rotary actuator assembly 18, corresponds to the center-to-center spacing between the gage point ports 22 or is approximately 0.1 inch. The width of the valving land 36' corresponds to the transverse dimension or diameter of one of the gage point ports 22. There may be some slight actual variation in the width of the land with respect to the port diameter, but this merely affects the sensitivity of the micrometer valve assembly.

In FIG. 4 there is illustrated the solid offset connection 211 between the beginning and terminating ends of the helical valving land 36' so as to maintain a continuous annular radial obstruction to the hydraulic fluid on opposite sides of the piston head 36. The effective arcuate extent or length of the helical valving land 36' and having the aforementioned lead of 0.1 inch, may be considered to begin at 212 and terminate at 213 as shown in FIG. 4, and is represented by the arrowed circular line 214 in FIG. 5.

It is important to point out that there is always leakage past the helical valving land 36' from high pressure cylinder chamber 47 into low pressure cylinder chamber 27 (FIG. 2). The extent of leakage depends upon such factors as the radial clearance between the land 36' and the cylinder wall 21, as well as the width of this land in relation to the diameter of a gage point port 22. Referring to FIG. 6, wherein a portion of the piston head 36 is shown in relation to a fragment of the cylinder wall 21 having a gage point port 22 therein, the pressure to the right of the helical valving land 36' in the chamber 47 is supply pressure $P_s$ and is always higher than drain pressure $P_d$ on the left-hand side of this land in the chamber 27. Flow through the radial clearance between the opposing faces of the helical valving land 36' and cylinder wall 21 is represented by the arrows 218 and 219. Effectively, there are provided two restrictions 220 and 221 at the edges of the land 36'. Accordingly, the pressure $P_i$ in the gage point port 22 and intermediate the restrictions 220 and 221 will be intermediate the values of the upstream pressure $P_s$ and the downstream pressure $P_d$. $P_i$ is the pressure which is established in the actuator chamber 32.

It is preferred that the area of end wall 30 in the outer rod member 24 be twice that of the effective axially facing area 37 of the piston head 36. If area 30 is twice that of area 37 then the intermediate pressure $P_i$ developed in the particular gage point port 22 associated with the helical valving land 36', will be one-half the supply pressure $P_s$ for a balanced condition. Thus, supply pressure $P_s$ effective over area 37 will produce a force against the outer rod member 24 in a left-ward direction while one-half such pressure, $P_i$, effective over twice the area 30, will produce the same force but effective in the opposite or rightward direction against the outer rod member 24, as viewed in FIGS. 2–4 and 6. The advantage of having an area ratio of two to one is to permit the same force capability in both axial directions. It also provides the same velocity of fluid flow in both directions of movement of the outer rod member 24. Furthermore, as will be apparent later, a balanced force condition will be achieved when the valving land 36' is centered with respect to a port 22 regardless of its diameter.

LINEAR SELECTOR VALVE ASSEMBLY

Details of the linear selector valve assembly 15 illustrated externally in FIG. 1 and diagrammatically in FIG. 2, are shown in FIGS. 7–12. The linear selector valve assembly 15 comprises a casing or housing 215 including a top wall 222, bottom wall 223, and end walls 224 and 225 which internally define a compartment 226 having parallel upper and lower wall surfaces between which a plurality of commutor plates and a plurality of switch plates are alternately arranged. Seven such commutor plates are shown for use with a ten-inch stroke actuator and they are designated 229, 231, 233, 235, 237, 239 and 241. Eight switch plates are shown and these are designated 228, 230, 232, 234, 236, 238, 240 and 242.

Referring to FIG. 10, the right-hand end switch plate 242 is shown as engaged by an inner portion 243 of an inner cover plate 244 arranged intermediate the housing 215 and the micrometer valve cylinder body member 21. This inner portion 243 is received in the cavity 226 of the housing 215. Left hand end switch plate 228 is shown as engaged by a pressure plate 245. Outwardly of this pressure plate 245 is an outer cover plate 246 having a portion 248 which projects into the housing cavity 226. A plurality of machine screws 249 passing through registered holes provided in the outer cover plate 246, the housing 215 and the inner cover plate 244, are screwed into threaded recesses provided in the body member 21 and when these screws 249 are tightened, these various members are clamped together.

As shown in FIG. 9, the corners of the flat valve plates 228, 230, 232, 234, 236, 238, 240, 242 have their corners bevelled so as to provide clearance with respect to the curved end walls of the compartment 226 in the valve housing 215. The commutor plates 229, 231, 233, 235, 237, 239, 241 are held against longitudinal movement relative to the valve housing 215. This is preferably accomplished by providing in the upper surface of each such commutor plate a keyway 250 (FIG. 7) which receives a key 251 (FIG. 9) arranged partially in a groove provided in the upper wall 222. The fit of the key 251 into the various commutor plate keyways 250 is such as to prevent any longitudinal movement of these plates relative to the housing 215. On the other hand, the eight switch plates 228, 230, 232, 234, 236, 238, 240, 242 are capable of having limited longitudinal movement. For this purpose, each such switch plate is provided with a keyway 252 which has a greater length measured longitudinally of the plates than the width of the key 251. The difference in length of the keyways 252 and the width of the key 251 which is received therein, delimits the amount of movement of these switch plates.

Any of the switch plates 228, 230, 232, 234, 236, 238, 240, 242 corresponds to the switch plate 41 illustrated typically in FIG. 2. At one end, specifically the left-hand end as viewed in FIGS. 7 and 9, the various switch plates are urged always to the right by the pressure behind the small pistons 50. The pistons 50 are supplied with hydraulic fluid to work thereagainst via a supply passage 52 (FIG. 9). The pistons 50 are staggered vertically and laterally in the casing end wall 224 and are covered by a removable cover plate 253.

At the opposite end, specifically the right-hand end as viewed in FIGS. 7 and 9, each of the various switch plates is engaged by a large piston 51. These pistons 51 are also arranged in vertical and laterally staggered fashion in the casing end wall 225 (FIG. 11) and are covered by a removable cover plate 254 (FIG. 9). Each of the pistons 51 is provided with fluid supplied through an independent passage 255 as shown in FIG. 11. These passages 255 in turn communicate severally with passages 256 provided in the lower body member of the linear transducer assembly 16. The compartment 226 in the housing 215 is connected to drain via the passage 71.

The inner cover plate 244 has one hundred holes 258 which at their outer ends communicate severally with the staggered gage point ports 22 and at their inner ends terminate in a straight row provided in the flat surface 259 of the cover plate. The one hundred holes 258 correspond to the ports such as the typical one 39 shown in FIG. 2. The pressure plate 245 at the opposite side of the stack of commutor and switch plates has a through hole 260 enlarged at its inner end as a recess 261 in the flat plate surface 262 as shown in FIG. 8. The outer end of the hole 260 communicates with the end of a passage 263 (FIG. 12) which is provided in the inner face of the outer cover plate 246. This passage 263 communicates with the actuator chamber 32 via the line or conduit 43 shown in FIG. 2.

The various commutor and switch plates are severally provided with transverse passages arranged so that the one hundred holes 258 shown can be individually and singly connected with the single port 260 by selectively manipulating one or more of the switch plates. Referring to FIGS. 7 and 8, the switch plate 242 is provided with fifty holes 264 having a center-to-center spacing corresponding to alternate holes 258 provided in the inner cover plate 243. The commutor plate 241 has fifty holes 265 each of which is large enough to maintain communication with the corresponding holes 264 in the switch plate 242 when the latter is in either of its extreme positions. The switch plate 240 has thirty holes 266 arranged to alternate communication between two adjacent holes 265 in the commutor plate 241. Commutor plate 239 has thirty holes 268 arranged in groups each including a pair of adjacent elongated slots and a round hole. The holes 268 severally communicate with the holes 266 in the switch plate 240 when the latter is in one of its positions but when in its other position only two-thirds of the holes 268 communicate with the holes 266. Switch plate 238 has twenty longitudinally spaced round holes 269 arranged in pairs one member of which alternates communication between the adjacent pair of slots 268 in commutor plate 239 and the other member of which is either in or out of communication with the adjacent round hole 268 depending upon the position of switch plate 238. Commutor plate 237 has twenty slots 270 arranged in ten pairs each including one short and one long slot communicating severally with the holes 269 in the switch plate 238. Switch plate 236 has ten holes 271 arranged to alternate communication between the two slots 270 in each of the ten pairs of the same in commutor plate 237. Commutor plate 235 has ten enlarged holes 272 which maintain communication with the corresponding holes 271 in the switch plate 236 when the latter is in either of its extreme positions. Switch plate 234 also has ten smaller holes 273 arranged to alternate communication between two adjacent holes 272 in the commutor plate 235. Commutor plate 233 has five elongated slots 274 each of which communicates with a pair of adjacent holes in switch plate 234. Switch plate 232 has five holes 275 arranged to alternate communication between two adjacent slots 274 in commutor plate 233. Commutor plate 232 has three transverse openings 276, two being shown as elongated slots and one as a round hole. Each slot 276 communicates with an adjacent pair of holes 275 and the round hole 276 is either in or out of communication with the remaining one of the holes 275 depending upon the position of switch plate 232. Switch plate 230 is shown as having three round holes 278 two of which are arranged to alternate communication with the slots 276 and the third of which is either in or out of communication with the round hole 276 depending upon the position of switch plate 230. Commutor plate 229 has two elongated slots 279 the first of which is in constant communication with two of the holes 278 and the second of which is in or out of communication with the third hole 278 depending upon the position of switch plate 230. Switch plate 228 has two holes 280 arranged to alternate communication with the slots 279 in commutor plate 229. Holes 280 have constant communication with the hole 260 in pressure plate 245.

In FIGS. 7 and 8, all of the switch plates are shown as shifted to their extreme leftward position. This is accomplished by applying pressurized fluid to all of the large pistons 51, achieved by the diaphragms 55 (FIG. 2) of the various linear transducers being seated against their respective nozzles 59 so as to close off communication to drain. As best shown in FIG. 8, in this position the hole numbered "0" finds a path through the left-hand endmost holes in the various switch and commutor plates to the single port 260 in the pressure plate 245. It will be seen that if the pressure behind the large piston 51 for the switch plate 242 is relieved, the biasing smaller piston 50 for this plate will switch the plate to its extreme rightward position in which the left-hand endmost hole 264 in the switch plate 242 will place the port numbered "1" in communication with the single port 260. In this manner, by relieving the pressure behind the large pistons 51 for one or more switch plates, a single flow path through the stack of commutor and switch plates can be provided whereby the desired one of the one hundred ports 258 can be placed in communication with the single port 260 in the pressure plate 245.

It will be seen that the various switch plates which are eight in number may be considered as provided in two sets, the first set including switch plates 242, 240, 238 and 236 controlling one digit, and the other set comprising switch plates 234, 232, 230 and 228 controlling another digit. Let the first digit represent the number of inches and the second digit represent the number of tenths of an inch, it is desired for the outer rod member 24 to move. For example, if a movement of the saddle member of 1.1 inches is required, switch plate 242 will be shifted to the right as also will be switch plate 234. This will establish communication between single port 260 in the pressure plate 245 with the hole 258 numbered "11" in the inner cover plate 243. Thus, the first set of switch plates 242, 240, 238 and 236 correspond respectively to the binary numbers "1," "2," "4" and "8." If one of these binary numbers is desired, only the corresponding switch plate is moved. However, if some intermediate number is desired, such as "3," the switch plates 242 and 240 will be moved; in the case of the number "5," switch plates 242 and 238 will be moved; in the case of the number "7," switch plates 242, 240 and 238 will be moved; and in the case of the number "9," switch plates 242 and 236 will be moved.

Similarly, the other set of switch plates 234, 232, 230 and 228 controlling the other digit, correspond respectively to the binary numbers "1," "2," "4" and "8." These switch plates can be moved singly or in combinations as has been previously described for the other set. The number "7." will require the greatest number of switch plates to be moved, three of each set.

It is desirable to maintain the various switch plates in a leftward position as viewed in FIGS. 7 and 8 so that pressure will be applied behind their respective large pistons 51. This minimizes the leakage to drain in the linear transducer assembly 16. To move a particular switch plate to the right requires connecting the hydraulic fluid chamber 58 (FIG. 2) of the companion linear transducer to drain via its branch drain line 63.

After the switch plates have been moved selectively to produce the two digits desired, the stack of switch and commutor plates are clamped together. They are movable in a direction normal to their opposing faces by sliding on the key 251 which extends in the same direction, namely transverse to these plates, keyways 250 in the commutor plates and keyways 252 in the switch plates cooperating with the key 251 for this purpose. Of course, the transverse movement is very slight, being only that necessary to press together the opposing and contacting faces of the various plates in order to minimize leakage from therebetween.

The means for clamping the plates comprise a plurality of cylindrical plungers 281 slidably arranged severally in cylindrical recesses 282 provided in the outer cover plate 246. Ten such plungers 281 are shown in FIG. 12. One end face of each of them engages the outer flat surface of the pressure plate 245 (FIG. 10). The various recesses 282 communicate with one another via a chordal passage 283 which intercepts each of these recesses adjacent their bases. One of the recesses 282 adjacent its base is shown as connected via the passage 284 to still another passage 285 provided in the lower wall 223 of the linear selector valve housing 215. The passage 285 in turn communicates with a passage 286 in the inner cover plate 244. Still another passage 288 in the cylinder body 21 connects the passage 286 with a source of fluid under pressure such as the main fluid supply line 70 (FIG. 2). The various passages 283–286 and 288 shown in FIG. 10 collectively correspond to the branch passages 69 shown in FIG. 2.

LINEAR TRANSDUCER ASSEMBLY

The details of the linear transducer assembly 16 shown in FIG. 1 are illustrated in FIGS. 9 and 13–15. The transducer assembly comprises lower and upper body members 290 and 291, respectively, which are essentially plates secured together in any suitable manner and to the upper wall 222 of the linear selector valve housing 215 as by the machine screws 292. The upper surface of the lower body member 290 is formed with a plurality of spaced recesses or chambers 58 and the lower surface of the upper body member 291 is formed with corresponding recesses or chambers 56. Eight such pairs of recesses are provided for the assembly illustrated, arranged in two rows as shown in FIG. 13. A thin flexible plate 293 is clamped between the opposing flat faces of the body members 290 and 291. The portions of this thin plate 293 which span the companion recesses 56 and 58 provide diaphragms 55. These diaphragms 55 correspond to the diaphragm bearing the same number shown in FIG. 2, and also the chambers 56 and 58 correspond to the pneumatic fluid and hydraulic fluid chambers bearing the same respective numbers illustrated in FIG. 2.

Each of the pneumatic fluid chambers 56 communicates with a vertical passage 294 terminating in its upper end as a nipple 295 to which a flexible conduit or hose 65 is connected. The hose 65 communicates with the companion tape reader tube 66 (FIG. 2).

Each of the hydraulic fluid chambers 58 is shown as having a centrally arranged upstanding nozzle 59 having an aperture 296 in its tip adapted to be closed by the corresponding diaphragm 55 when the latter is urged downwardly so as to engage the tip of the nozzle. Each nozzle aperture 296 communicates via a passage 298 with a supply passage 299. Each passage 298 has a restriction 62 therein. Each nozzle passage 298 also has a branch passage 300 which leads to a vertical passage 256 (FIG. 15) in communication with the corresponding passage 255 in the linear selector valve housing 215 (FIG. 9). The various interconnected fluid supply passages 299, 298, 300, 256 and 255 correspond to the fluid supply line 53, 61 and 54 shown in FIG. 2.

Each of the hydraulic fluid chambers 58 has a vertical drain passage 301. The four vertical drain passages 301 on each side of the transducer assembly are shown as manifolded into a horizontal passage 302. The two manifold passages 302 are shown as connected to a cross passage 303 which in turn is connected to a vertical passage 304 which communicates with a drain passage 305 provided in the top wall 222 of the linear selector valve housing member 215 and leading to the compartment 226 thereof which in turn is drained via the passage 71 as shown in FIG. 9. The various interconnected drain passages 301–305, 226 and 71 correspond to the interconnected drain lines 63 and 45 shown in FIG. 2.

The various flexible pneumatic lines 65 can be grouped together to extend through a surrounding protective hose 306 (FIG. 1) which leads to the tape reader illustrated only diagrammatically in FIG. 2.

It will be seen that if the pressure of the pneumatic fluid in any chamber 56 is maintained above a predetermined level, this pressure will urge the coresponding diaphragm 55 into seated engagement with the tip of the companion nozzle 59 and thereby close the aperture 296 thereof. With the nozzle 59 closed, fluid being supplied through the line 298 cannot communicate with the drain passage 301. Instead, the pressurized supply fluid is applied via the passages 300, 256 and 255 to the large pistons 51 for the various switch plates of the linear selector valve assembly 15.

MICROMETER VALVE ROTARY ACTUATOR ASSEMBLY AND ROTARY SELECTOR VALVE ASSEMBLY

The details of the micrometer valve rotary actuator assembly 18 and the rotary selector valve assembly 19 shown in FIG. 1 are illustrated in FIGS. 16-20.

Figure 18:
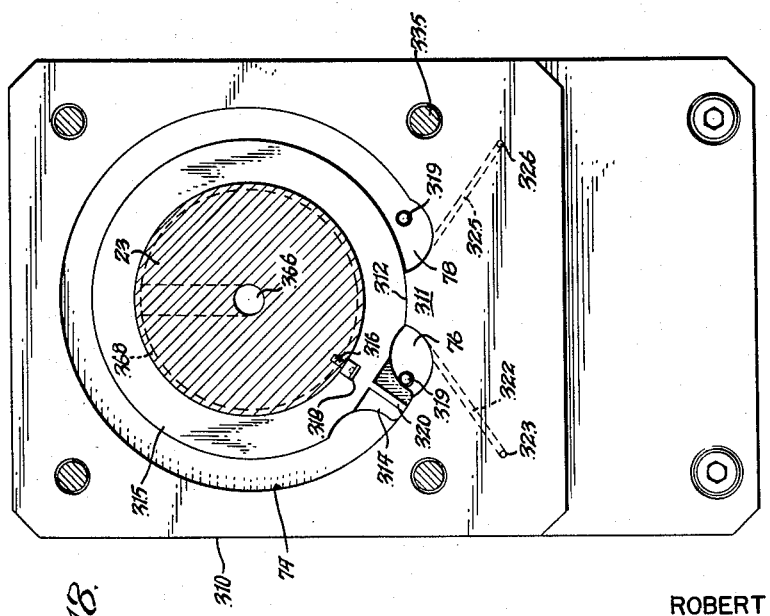

Considering the micrometer valve rotary actuator assembly first, the same comprises an inner end plate 308 having an annular portion 309 projecting axially into the bore of the micrometer valve cylinder 21 (FIG. 16). Adjacent the end plate 308 is a rotary actuator housing 310 internally formed with a cylindrical compartment 74 interrupted by an inwardly projecting radial portion 311 having a radially inwardly facing arcuate surface 312 concentric with the wall of the cylindrical compartment 74 (FIG. 18). At its axially outer side, the compartment 74 is closed by an outer end plate 313. The inner rod member or shaft 23 is journalled in the tubular portion of the end plate 308 and projects therethrough into the compartment 74.

Arranged within the compartment 74 is a radial vane member 314 having an annular hub 315 which surrounds the end of the inner rod member 23 (FIG. 18). The vane member 314 is fast to the inner rod member 23 so as to rotate therewith. For this purpose, the inner rod member is shown as carrying a radial pin 316 which has an enlarged head projecting outwardly from the periphery of the inner rod member 23 and received in a recess 318 provided in the hub portion 315 of the vane member 314.

Figure 19:
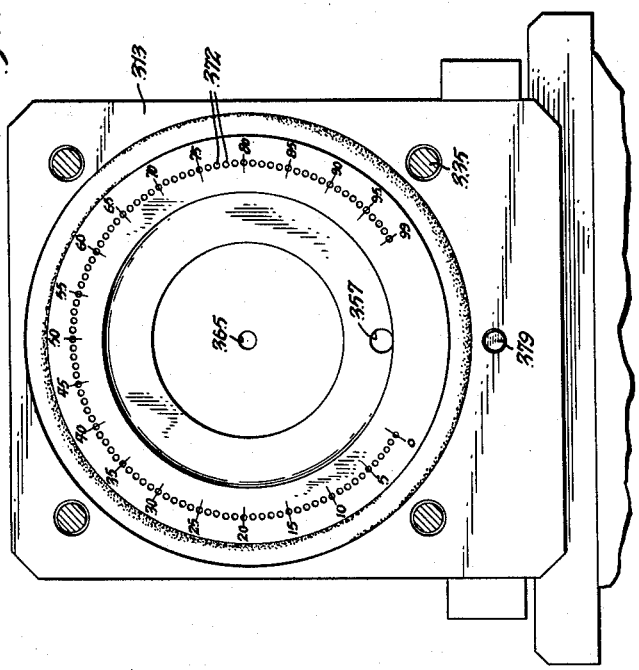

The vane member 314 is arranged in the compartment 74 between the end plates 308 and 313. The arcuate movement of the vane member 314 is limited by a pair of axially extending stop pins 319, 319 arranged severally on opposite sides of the radially inwardly projecting portion 311 of the housing member 310. The circumferentially facing and opposite sides of the radial portion of the vane member 314 is undercut so as to leave a relatively narrow, axially facing surface or land 320 which traverses the flat inner end face 321 of the outer end plate 313 (FIGS. 18 and 19).

The radial portion of the vane member 314 divides the compartment 74 into two unconnected chambers 76 and 78 (FIGS. 2 and 18). Each of these chambers 76 and 78 is supplied with hydraulic fluid under pressure. Leading to the chamber 76 is a passage 322 which communicates with an axial passage 323, both provided in the rotary actuator housing member 310. The axial passage 323 communicates with an axial passage 324 provided in the inner end plate 308 and has a restriction 82 therein (FIG. 16). The other chamber 78 communicates with a passage 325 and axial passage 326, both provided in the rotary actuator housing member 310. This axial passage 326 communicates with a passage similar to passage 324 and has a restriction 83 (FIG. 2) therein. This last mentioned passage and the similar passage 324 illustrated in FIG. 16 are provided in the inner end plate 308 and communicate with a cross passage 328 in turn communicating with a passage 329, also provided in this inner end plate. The passage 329 communicates with a passage 330 provided in the micrometer valve cylinder body 21. The various passages 330, 329, 328 correspond to the fluid supply line 81 shown in FIG. 2. The lines 324, 323, 322 correspond to the line 79 shown in FIG. 2 and having a restriction 82 therein. Another passage 324 (not shown) jointly with the passages 326 and 325 correspond to the line 80 shown in FIG. 2 having the restriction 83 therein.

From the foregoing, it will be seen that rotation of the vane member 314 will cause the inner rod member 23 to rotate and this in turn will rotatably drive the outer rod member 24 (FIGS. 2 and 3).

Considering now the rotary selector valve assembly 19, the same is shown as comprising a housing member 331 formed internally to provide a cylindrical compartment 332 having a longitudinally extending groove or channel 333 in its bottom (FIGS. 16 and 17). The outer end of the rotary selector valve housing member 331 is closed by an end cap 334.

Various elements including the end cap 334, the rotary selector valve housing member 331, the rotary actuator outer end plate 313, the rotary actuator housing member 310 and the rotary actuator inner end plate 308, are clamped together and secured to the end of the micrometer valve cylinder body 21 by a plurality of axially extending machine screws 335 which pass through alined holes provided in these elements and screwed into internally threaded recesses (not shown) in the cylinder body 21.

The outer end plate 313 for the rotary actuator is shown as having an outwardly projecting cylindrical tubular axial extension 336 which is concentric with the compartment 332 of the housing member 331 and terminates short of the end cap 334. Arranged within the cylindrical compartment 332 and surrounding the end plate extension 336 and rotatably and axially slidably supported thereon, are a plurality of rotary valve commutor and switch plates or rings including eight switch rings 338, 340, 342, 344, 346, 348, 350 and 352, and also including seven intermediately and alternately disposed stationary commutor rings 339, 341, 343, 345, 347, 349 and 351. The various rings 338–352 are flat sided and are stacked axially so as to have their opposing faces contacting each other. The stack of rings 338–352 at its inner end abuts against an annular abutment 353 formed as an axial extension on the outer end plate 313 for the rotary actuator. At its bottom the annular abutment 353 is shown as having a radial slot 354 which is in constant communication with the channel 333 in the rotary selector valve housing member 331. The outer end plate 313 has an axially extending hole 357 (FIGS. 16 and 19) which extends between the top of the channel 333 and a clearance 367 between the spaced opposing end faces of the inner rod member 23 and tubular extension 336.

The various rings 338–352 at their tops are internally formed individually with a recess 355 which jointly provide an axial passage to receive fluid leaking between the various rings. The array or stack of rings 338–352 is adapted to be clamped against the annular abutment 353 so as to minimize leakage. For this purpose, a pressure plate 356 is arranged between the outer endmost switch ring 352 and the end cap 334. The pressure plate 356 has abutments 358 on its inner face which engage the outer end face of the switch ring 352 at circumferentially spaced intervals leaving radial passages therebetween. The pressure plate 356 is urged to move inwardly by hydraulic fluid and for this purpose, the end cap 334 is provided with an annular groove 359 in which a ring piston 360 is arranged. One end of this ring piston 360 bears against the outer end face of the pressure plate 356. The other end of the ring piston 360 is bifurcated to provide axially and radially outwardly projecting continuous wings 361. The outer edges of these rings 361 are adapted to wipe the annular walls of the groove 359 so as to be in sealing engagement therewith. Fluid under pressure is supplied to the chamber 362 at the base of the groove 359 between the wings 361, via a supply passage 363. Thus, if the hydraulic fluid under pressure is supplied through passage 363 it will drive the ring piston 360 to the left as viewed in FIG. 16, the wings 361 spreading against the walls of the groove 359 to seal against the leakage of pressurized fluid. Leftward movement of the ring piston 360 urges the pressure plate 356 against the stack of rotary selector valve rings 338–352 and these in turn against the stationary abutment 353.

Any leakage past the ring piston 360 escapes to a recess 364 provided centrally in the inner face of the end cap 334. This recess 364 in turn communicates via the hole 365 provided centrally through the pressure plate 356, with the interior of the tubular extension 336 with which the clearance 367 also communicates. The interior of this extension 336 in turn communicates with a passage 366 in the inner rod member 23. The passage 366 leads to and communicates with an annular groove 368 provided in the periphery of this rod member 23. The annular flange 309 of the inner end plate 308 for the rotary actuator is provided with a radial hole 369 which leads from the groove 368 to an annular groove 370 provided in the outer peripheral surface of this flange. A radial hole 371 in the cylinder wall 21 communicates with the annular groove 370. Thus, the recess 364, hole 365, interior of the tubular extension 336, passage 366, groove 368, hole 369, groove 370 and hole 371 provide a continuous passage connected via the line 110 (FIG. 2) to fluid drain. The channel 333 is also in this drain system via the intercommunicating passages 354, 357 and 367.

As with the commutor and switch plates for the linear selector valve assembly 15, the commutor and switch rings 338–352 are provided with circular arrays of holes selectively adapted to provide a single flow path between any one of one hundred ports 372 provided as passages extending axially through the outer end plate 313 for the rotary actuator and a single outlet hole 373 provided in the outer endmost switch plate 352. This hole 373 is in constant communication with the interior of the hollow extension 336 which in turn is connected to drain as described hereinabove, by reason of the clearance 374 which exists constantly between the opposing end faces of the tubular extension 336 and pressure plate 356. The longitudinal passage formed by the recesses 355 in the rings 338–352 also constantly communicates with this clearance 374 and hence with the fluid drain.

The layout of the various holes in the switch and commutor rings 338–352 follows that for the switch and commutor plates of the linear selector valve assembly 15 except that with the rings the various holes are arranged in a circular line instead of a straight line. As typical of the various rings, the hole arrangement in switch ring 344 is illustrated in FIG. 17, such arrangement including ten holes 375.

The holes 372 in the outer end plate 313 for the rotary actuator correspond to the outlet ports 84 shown in FIG. 2. The ends of these holes 372 individually are adapted to be closed by the land 320 on the radial vane member 314. If the switch rings 338, 340, 342, 344, 346, 348, 350, 352 are selectively moved, the desired one of the one hundred holes 372 will be connected through the stack of rings 338–352 to drain. This unbalances the pressures on opposite sides of the radial vane member 314 due to corresponding flow through orifice restrictions 82 and 83. The resultant differential pressure on vane member 314 causes the inner rod member 23 to rotate until the land 320 positions itself over the vented one of the holes 372, at which time further outward flow of fluid through this hole is cut off.

Each of the commutor rings 339, 341, 343, 345, 347, 349, 351 has a downwardly projecting integral arm 376 which is received in the channel 333 in the rotary selector valve housing member 331. Each such arm 376 has a through hole 378 and the holes 378 in the various arms 376 are in axial alinement and receive an elongated pin 379. The inner end of this pin is anchored suitably in the rotary actuator outer end plate 313 and the outer end of the pin is anchored suitably in the end cap 334. Thus, the pin 379 holds the commutor rings against angular movement but permits axial movement as caused by the clamping plate 356.

Each of the switch rings 338, 340, 342, 344, 346, 348, 350, 352 is also provided with a downwardly extending integral arm 380. Each of these arms is provided with an axially extending through hole 381 which is larger in diameter than the pin 379 which extends axially through the holes 381. Engagement of the wall of a hole 381 in any given switch ring with one side of the pin 379 limits angular movement of that switch ring in one direction. Engagement with the other side of the pin limits movement in the opposite direction.

Figure 20:
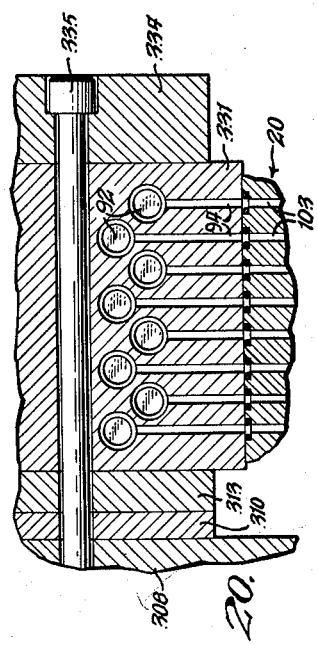
FIG. 20 is a fragmentary vertical longitudinal sectional view thereof taken on line 20—20 of FIG. 17.

As illustrated diagrammatically in FIG. 2, each of the rotary switch plates or rings is engaged by a small piston 91 on one side and a large piston 92 on the other side. Referring to FIG. 17, the pistons 91 and 92 are arranged on opposite sides of the arms 380 for the various switch rings. Eight such pairs of small and large pistons are provided for the eight switch rings. The small pistons 91 are shown as arranged on the left side of the particular switch ring 344 illustrated and fluid is applied to these small pistons 91 by branch passages 93 severally communicating with a common pressure fluid supply line 52 (FIG. 2). The large piston 92 is shown in FIG. 17 as arranged on the right hand side of the arm 380 for the particular switch ring 344 illustrated. As best shown in FIG. 20, the eight large pistons 92 are arranged in staggered relation in two rows, as are the small pistons 91 on the opposite side. Fluid is supplied to each large piston 92 through a vertical passage 94 which communicates with the passage 103 for the corresponding transducer in the rotary transducer assembly 20. Plugs for the outer ends of chambers in which the small pistons 91 are arranged are covered by a removable cover 382. Similarly, the large pistons 92 are inserted into chambers plugged and held by a removable cover 383.

The rotary transducer assembly 20 in detail is constructed similarly to that described for the linear transducer assembly 16 and illustrated in FIGS. 9 and 13–15. A repetition of description is not deemed necessary. Suffice it to say that each of the large pistons 92 is associated with one of the rotary transducers whereby these pistons can be selectively moved.

ELECTRICAL CIRCUIT

The electrical circuit for operating the various solenoids $S_1$, $S_2$, $S_3$ and $S_4$ is diagrammed in FIG. 21. As there shown, the electrical power lines are represented at 395 and 396. Between these lines is arranged a first timing relay 398 and a second timing relay 399. The timing relay 398 has three sets of contacts severally associated with armatures 400, 401 and 402. These armatures are ganged together and also to the movable element of a dashpot device 403. When the coil of the relay 398 is energized, the various armatures 400–402 remain in the position shown in FIG. 21 until the end of the time delay provided by the dashpot 403, at which time these armatures snap to their other position.

The coil 124 of the solenoid valve $S_1$ is arranged in a line 404 connected at one end to the main power line 396 and at its other end to one of the contacts for the armature 402. The other contact is connected by a line 405 to one contact of a switch 406. The other contact of this switch is connected by a line 408 to the power line 395. The switch 406 is illustrated in a closed position. This switch is actuated by a camming lug 409 on the periphery of a drive wheel 410 for the tape 111 shown in FIG. 2. When this tape advances, its drive wheel 410 rotates one revolution and momentarily opens the switch 406.

The coil 141 of the solenoid valve $S_2$ is arranged in a line 411 one end of which is connected to the power line 396 and the other end of which is connected to one of the contacts for the armature 401. The other contact is connected by a line 412 to one contact of the pressure switch 117, the other contact of which is connected by a line 413 to the line 405.

A line 414 connects the line 412 to one side of the coil of the relay 398, the other side of which is connected by a line 415 to the power line 396. A holding circuit for the relay 398 is provided by the armature 400 connected by a line 416 to the line 413, and operatively associated with a contact connected by a line 418 to the line 414.

The coil 154 of the solenoid valve $S_3$ is arranged in a line 419 connected at one end to the power line 396 and at its other end to one of the contacts for the pressure switch 184. The other contact of this switch is connected by a line 420 to one contact of a switch 421, the other contact of which is connected by a line 422 to the power line 395. The switch 421 is shown in an open condition and is closed when the spindle of the machine tool retracts.

The timing relay 399 is shown as having two armatures 423 and 424. These armatures are ganged together and also to the movable element of a dashpot device 425. When the coil of the relay 399 is energized, the armatures 423 and 424 remain in the position shown until the end of the delay time provided by the dashpot device 425 whence these armatures move quickly to their other contacts. The armature 423 is shown as arranged in a branch circuit by-passing the pressure switch 184. For this purpose, one contact of the armature 423 is connected by a line 426 to the line 420 and the other contact for this armature is connected by a line 428 to the line 419. The one side of the coil of the relay 399 is connected by a line 429 to the line 428 and the other side of this coil is connected by a line 430 to the power line 396.

The contacts for the armature 424 are operatively associated via the lines 431 with the feed circuit (not shown) for the machine tool.

The coil 190 of the solenoid valve $S_4$ is shown as arranged in a line 432 having one end connected to the power line 396 and its other end connected to one of the contacts for the pressure switch 199. The other contact for this switch is connected by a line 433 to the power line 395.

OPERATION OF FIGS. 1–21

While it is apparent that in a commercial form of positioning apparatus constructed in accordance with the principles of the present invention, the positioners for the X and Y axes will be controlled manually as well as automatically, they are illustrated herein as being controlled only automatically since this will be the most common mode of operation. This is achieved by the digital information punched on the tape 111. Periodically, this tape 111 moves so as to position successive lengths or blocks of the tape opposite the tape reader head 112. The system has been designed to read information for the next machining operation while the preceding one is taking place. Accordingly, descent of the tool such as the cutting tool 5 shown in FIG. 1 will cause the tape to advance.

Referring to FIG. 21, it is assumed at this time that the timing relay 398 is energized whereby its various armatures 400, 401 and 402 are in their respective positions opposite from those shown in FIG. 21. Thus, current will flow from power line 395 through the coil of the relay 398 to the other power line 396 by passing through the line 408, closed switch 406, lines 405, 413, 416, armature 400, lines 418 and 414, the coil of the relay 398 and the line 415. When the tape 111 is driven or moved longitudinally so as to present its next block of information, the tape drive wheel 410 will rotate through one revolution whereby the switch 406 is opened momentarily. When this occurs, the holding circuit through the timing relay 398 is broken, thereby deenergizing this relay and returning its various armatures 400, 401 and 402 to their respective positions shown in FIG. 21.

When the timing relay 398 is deenergized and after the switch 406 has again returned to its closed position as illustrated in FIG. 21, a circuit will be established through the coil 124 of the solenoid valve $S_1$. This circuit is established through line 408, closed switch 406, line 405, armature 402 and line 404. Energization of the solenoid valve $S_1$ will cause its valve slide 122 to move from its lower position shown in FIG. 2 to an upper position in which the pneumatic fluid lines 114 and 115 are connected via the through passage 125 in this valve slide. Thus, pressurized air from a suitable source such as an air compressor (not shown) flows from line 114 into line 115, thence into manifold line 116 and the tape reader tubes such as 66, 101 and 119. The pressure in the line 115 is sensed by the pressure switch 117. Since flow from the line 115 through the line 107 and through the restriction 127 in the latter takes a finite time in order to build up sufficient pressure to actuate the pressure switch 117, a slight time delay is provided for pressure build-up in the various connected passages 115, 116, 66, 101 and 119 before solenoid valve $S_2$ is energized.

Referring to FIG. 21, when pressure switch 117 closes, a closed circuit is established for the coil 141 of the solenoid valve $S_2$, such circuit including the line 413, now closed pressure switch 117, line 412, armature 401 and line 411 in which the coil 141 is arranged.

At the same time solenoid valve $S_2$ is energized, the timing relay 398 is energized. This is accomplished by closing a circuit through the coil of this relay, such circuit including the line 414, the relay coil and line 415. It is to be remembered that the various armatures 400, 401 and 402 are not moved away from their respective positions shown in FIG. 21 until the relay 398 times out. When the relay does time out and these armatures move to their respective alternate positions, a holding circuit is established to maintain the relay 398 energized. This circuit includes the line 416, armature 400, line 418, the coil of relay 398 and line 415. The timing relay 398 is, therefore, maintained in an energized condition until the tape drive wheel 410 cams the switch 406 open again. After the energized timing relay 398 has timed out, the circuits through the coils of the solenoid valves $S_1$ and $S_2$ will be broken so as to deenergize these valves.

It will be seen that when solenoid valve $S_1$ is energized, it admits pressurized pneumatic fluid into the tape reader. Following a short delay until the pressure of this fluid in the reader has built up to a predetermined level, as determined by the pressure switch 117, the solenoid valve $S_2$ is energized. Referring to FIG. 2, energization of the solenoid valve $S_2$ will move its valve slide 138 upwardly so as to establish communication between the hydraulic fluid supply line 133 and the downstream line 135 on the other side of the solenoid valve. Connection of these lines 133 and 135 permits hydraulic fluid, maintained at a pressure within a predetermined range as hereinafter explained, to flow into the main line 53 from whence fluid flows via the branch lines 61 and 104 into the linear and rotary transducer assemblies 16 and 20, respectively.

Consider for the moment that a punched hole in the tape 111 is opposite the lower end of the tape reader tube 66 while there is no hole in the tape opposite the lower end of the tape reader tube 101. This means that pressure cannot be built up within the chamber of tube 66 while it can be built up in the chamber of tube 101. Since the pressure in the line 64 connected to the tube 66 and leading to the chamber 56 is below a predetermined level, the diaphragm 55 remains separated from the nozzle 59. In this condition, hydraulic fluid entering through branch line 61 into line 60 can flow through the aperture of the nozzle 59 into the chamber 58 and thence into the branch drain line 63 which leads into the main drain line 45. No pressure of the hydraulic fluid in the line 54 can be built up and, accordingly, the large piston 51 operatively associated therewith in the linear selector valve assembly 15 will not overcome the force exerted by the small and biasing piston 50. Since this is tantamount to relieving the pressure behind the large piston 51, the valve plate 41 associated therewith will be shifted by the small biasing piston 50.

On the other hand, when considering the rotary transducer in the assumed example, the pressure of the pneumatic fluid being built up in reader tube 101 is transmitted via the line 99 to the chamber 95. Since this pressure rises above a predetermined level, the diaphragm 98 is caused to move toward and seat on the tip of the nozzle 102 thereby destroying communication between the line 103 and branch drain line 106. Accordingly, pressure of the hydraulic fluid in the line 94 can build up to exert a force upon the large piston 92 in the rotary selector valve assembly 19. The rotary valve plate 90 will then be moved under the dominant force exerted by the large piston 92, if this plate is not already in the extreme position urged by this piston.

It is to be noted that the small pistons 50 and 91 are supplied via the lines 52 and 93 with pressurized hydraulic fluid since these lines are connected to the main line 53 from which the transducer assemblies 16 and 20 also derive their hydraulic fluid.

It will be understood that there are eight reader tubes 66 for the eight switch plates included in the linear selector valve assembly 15 and severally associated by the individual transducers in the linear transducer assembly 16. Likewise, there are eight reader tubes 101 for the eight rotary switch plates or rings in the rotary selector valve assembly 19 severally associated by the individual transducers in the rotary transducer assembly 20.

Since solenoid valve $S_2$ is energized following a short time delay after energizing solenoid valve $S_1$, the various diaphragms of the transducers can move against their nozzle seats without having to oppose hydraulic pressure. After the diaphragms have been selectively seated by the pneumatic fluid, the pressurized hydraulic fluid controlled by the opening of the solenoid valve $S_2$ is applied to the transducers to control the corresponding selective actuation of the various selector valve switch plates.

It will be understood that the position readout just described occurs during an operation in which a cutting tool is engaging the workpiece, the spindle for such cutting tool being in a lowered position. Such machining operation may take a varying length of time as determined by tool speed and tool feed. Incidentally, these are auxiliary functions that can be read out by pressure switches such as the switches 121 associated with the reader tubes 119. Thus, auxiliary tool function is read out at the same time position is read out for the next succeeding machining operation, digital information therefor being punched on the tape 111.

As the tool spindle retracts, it closes the limit switch 421 (FIG. 21). This closes a circuit through coil 154 of solenoid valve $S_3$, such circuit including line 422, closed switch 421, line 420, pressure switch 184 which is assumed to be closed, and line 419 which includes the coil 154. Simultaneously a bypass circuit is established around the pressure switch 184, such bypass circuit including the line 426, armature 423 and line 428. Thus, the coil 154 of the solenoid valve $S_3$ can be energized through the pressure switch 184, if closed, or through the bypass circuit just described.

It will be seen that closing of the switch 421 also immediately energizes the coil of the timing relay 399 since one side thereof is connected by the line 429 to the bypass circuit and the other side of the coil is connected by the line 430 to the power line 396. After the timing relay 399 times out, the armature 423 moves to its alternate position thereby breaking the bypass circuit around the pressure switch 184. Also, the armature 124 moves to its alternate position thereby interrupting the circuit through the lines 431 which are operatively associated with the machine feed circuit. When the tool spindle again descends, it will open the switch 421, thereby deenergizing the timing relay 399 and rendering it impossible for the pressure switch 184, even though it may be closed, to establish a closed circuit through the solenoid valve $S_3$ to energize its coil 154.

Referring to FIG. 2 when the solenoid valve $S_3$ is energized, its valve slide 146 is moved upwardly to unlock the clamp device 159 and to operate the selector valve clamps 68 and 108. With the valve slide 146 now in its upper position, the line 156 leading to the clamp device 159 communicates with the drain line 160 via the inclined passage 152 in this valve slide. Also, the pressurized hydraulic fluid supply line 145 is placed in communication with the line 163 on the downstream side of the solenoid valve $S_3$ via the inclined passage 151 in the valve slide 146. Thus, the chamber 202 of the clamp device 159 is connected to drain thereby unlocking this device, and pressurized hydraulic fluid is permitted to enter the main line 70 from whence it can flow via the branch line 81 to the micrometer valve rotary actuator assembly 18 and also to the selector valve clamp plungers 68 and 108 via the branch lines 69 and 109, respectively.

As pressure builds up in the line 163 it is transmitted to the actuator piston 171 for the hydraulic valve 165 to move the valve slide 166 thereof downwardly. Downward movement of this valve slide 166 brings the through passage 168 therein into alinement with the fluid supply line 175 and downstream line 181. Thus, the line 49 leading to the micrometer valve cylinder 21 is connected to the outlet of the pump 130. Fluid flows through these connected lines into the chamber 47 of the cylinder 21 on the right-hand side of the piston head 36 to bear against the end face 37 thereof. This fluid will develop a pressure sufficient only to overcome inertia and frictional forces resisting movement of the saddle member 8.

If, for example, one of the gage point ports 22 to the left of the piston head 36 as shown in FIG. 2 is connected via the linear selector valve assembly 15, line 43, annular groove 35 and passages 34 and 33 to the actuator chamber 32, it will be seen that this chamber 32 is connected to drain since the left-hand end portion 27 of the cylinder 21 is connected via the lines 44, 45 and 48 to the drain 46. Fluid entering the right-hand end portion 47 of the cylinder 21 causes the outer rod member 24 which carries the piston head 36 to shift to the left until the helical valving land 36′ nulls or centers on the vented gage point port 22. When this occurs, and if the area of end wall 30 is twice that of the piston end face 37, a pressure $P_i$ (FIG. 6) will be established in the actuator chamber 32 which is half that of the supply pressure $P_s$ entering through line 49.

It will be seen that as the helical valving land 36′ closely approaches its nulled or centered position, the pressure in the supply line 49 gradually increases. Up to this point, the pump 130 was operating on a constant flow basis. With the pressure in actuator chamber 32 half that of the hydraulic fluid in supply line 49 and with the area of end wall 30 twice that of piston end face 37, it will be seen that opposed hydraulic forces of equal value act upon the outer rod member 24 and bring the saddle member 8 to rest in the desired predetermined location.

While this is occurring, the rotary actuator assembly 18 is rotating the shaft or inner rod member 23 through the desired angular increment, as determined by the opened one of the ports 84 and the corresponding hydraulic drive on the vane member 72. Rotation of the inner rod member 23 causes the outer rod member 24 and the piston head 36 thereon with its helical valving land 36′, to rotate. This produces a vernier or micrometer axial displacement of the outer rod member 24 and hence of the saddle member 8.

On the other hand, if one of the gage point ports 22 to the right of the piston head 36 as shown in FIG. 2 is connected to the actuator chamber 32, it will be seen that hydraulic fluid under supply pressure will flow into this actuator chamber. This flow continues until rightward movement of the valving land on the piston head substantially closes off the particular gage point port 22 that had been opened. When this occurs, the higher pressure $P_s$ acting over the half area 37 will produce a force on the outer rod member 24 which counterbalances the half pressure $P_i$ acting over the larger area 30.

Insofar as the coil 154 of the solenoid valve $S_3$ is concerned, this coil will remain energized until the last of either two things occurs. One thing is the pressure building up in the line 49 to a predetermined level, being sensed by the pressure switch 184, whereupon this switch opens. This assures completion of the axial movement of the outer rod member 24 which controls the position of the saddle member 8. Typically the pressure switch 184 may be set to open at 300 p.s.i. The restriction 185 in the branch line 183 provides a time delay to insure that the micrometer valve has achieved its new position before the pressure switch 184 becomes operative to break one possible circuit through the coil 154 of the solenoid valve $S_3$. The other thing is the timing relay 399 timing out to break the bypass circuit around the pressure switch 184. When the last of these two things occurs, all possible circuits through the coil 154 of the solenoid valve are broken and this coil is denergized, thereby returning its valve slide 146 to its downward position in which the clamp device 159 is again locked by reason of its line 156 being connected with the supply line 145 via the through passage 148 in the valve slide. When this occurs, the pressure behind the selector valve clamp plungers 68 and 108 is relieved, being connected to drain via the line 163, through passage 149 and drain line 160. The restriction 161 in the latter assures a time delay in bleeding down the selector valve clamp plungers 68 and 108 until after the pressure in the right-hand end portion 47 of the cylinder 21 and in the particular gage point port 22 and communicating passage leading to the actuator chamber 32 has bled down into the left-hand end portion 27 of the cylinder 21 which is constantly connected to drain.

When the solenoid valve $S_3$ is deenergized, hydraulic actuation of the hydraulic valve 165 terminates whereupon the latter's valve slide 166 moves upwardly to block communication between the lines 175 and 181, 49. With the valve slide 166 of the hydraulic valve 165 in its upper position, the supply line 175 is connected to the line 176 on the downstream side of the hydraulic valve 165 via the inclined passage 169 in this valve slide. If the solenoid valve $S_4$ is deenergized, the line 176 communicates with the drain 193 via the line 192 in which the radiator 194 is arranged.

The solenoid valve $S_4$ is controlled by the pressure switch 199 connected to the pump discharge line 133 on the downstream side of the check valve 134. The pressure switch 199 is adjusted to close a circuit through the coil 190 of the solenoid valve $S_4$ when the pressure in the line 133 on the downstream side of the check valve 134 falls to a predetermined lower level, such as 400 p.s.i. Pressure in this line 133 is normally maintained by the accumulator 143. Should the pressure drop below the predetermined level, the solenoid valve $S_4$ is energized so as to block the connection of the pump discharge line 133 upstream of the check valve 134 with the drain 193. This causes the hydraulic fluid discharged by the pump 130 to build up in pressure so as to pass the check valve 134 and charge the accumulator 143 until a predetermined pressure level, such as 500 p.s.i., is reached at which time the pressure switch 199 will open thereby breaking the circuit through the coil 190 of the solenoid valve $S_4$.

It will be seen that the pump 130 has two functions. One is to maintain a constant pressure system on the downstream side of the check valve 134 to keep a supply of hydraulic fluid under substantially constant pressure available for use to actuate the small pistons and through the transducer assemblies the large pistons for the various selector valve switch plates, and also to operate the micrometer valve rotary actuator assembly 18 and the selector valve clamping plungers 68 and 108. The other function of the pump 130 is to provide a constant flow system through the hydraulic valve 165 to make fluid available for flow through the line 49 leading to the micrometer valve cylinder 21.

It is an advantageous feature of the hydraulic power supply system disclosed that the flow for moving the outer rod member 24 connected to the saddle member 8 is not supplied under any higher pressure than is necessary to drive the movable elements, until the helical piston head 36 approaches its nulled position at which time the pressure builds up. Holding the oil at a lower pressure keeps it cool and prevents dimensional growth of various structural elements that would otherwise occur if these elements were contacted by heated oil. The radiator 194 is utilized to cool the oil to the extent that it may be heated up in the hydraulic system so as to maintain hydraulic fluid at substantially constant temperature and thereby promote high accuracy for the positioners.

It will be understood that opening one of the gage point ports 22 in the micrometer valve cylinder 21 controls the analog axial position corresponding to the digital information in the form of the number of inches and the tenths of an inch desired in the ultimate position of the saddle member 8. Also, the one hundred ports 84 of the rotary actuator assembly 18 controls the analog axial position corresponding to the digital information in the form of hundredths and thousandths of an inch. In this manner tape controlled digital information on the tape 111 produces an analog position of the outer rod member 24 and hence the saddle member 8. It is apparent that as many gage point ports as desired may be provided.

When the cutting tool descends after the saddle and table members 8 and 10, respectively, have been positioned, the tape 111 is advanced to supply the next block of information for reading out the next position to be produced but not sought until after the preceding machining operation is completed.

With one positioner 13 controlling movement of the saddle member 8 relative to the machine bed 6 and the other positioner 13a controlling movement of the table member 10 relative to the saddle member, it is apparent that the workpiece 11 can be moved from point to point as selectively desired.

MODIFICATION OF FIG. 22

In FIG. 2, the fluid acting upon the end face 37 of the piston head 36 urged the saddle member 8 to the left whereas fluid acting upon the end wall 30 within the outer rod member 24 urged the saddle member to the right. In the modification of FIG. 22, the actuator means for moving the saddle member 8 are provided externally of the micrometer valve assembly 14a.

In FIG. 22, the separate power actuator means are shown as comprising a cylinder 384 having a piston 385 axially slidably arranged therein and connected to the saddle member 8 by a piston rod 386 extending outwardly through the right-hand end wall of the cylinder. As shown, the left-hand end face 388 of the actuator piston 385 has twice the area of the end face 389 on the opposite side of this piston. The chamber 390 to the left of the actuator piston is shown as connected via the fluid conduit or line 391 to the single port 40a in the linear selector valve assembly 15a. The chamber 392 on the opposite or right-hand side of the actuator piston is connected to a fluid conduit or line 393. This line 393 is connected to a suitable source (not shown) of hydraulic fluid under pressure.

The left-hand end portion of the micrometer valve cylinder 21a is shown as connected via the fluid conduit or line 44a to drain and the right-hand end portion is connected via the fluid conduit or line 49a to a suitable source (not shown) of hydraulic fluid under pressure, such as the fluid line 393.

Various elements in the embodiment of FIG. 22 correspond to similar elements shown in FIG. 2 and are therefore represented by the same reference numerals except for bearing the subscript "a."

In the operation of the modification shown in FIG. 22 the linear selector valve 15a is actuated selectively to establish communication between the desired gage point port 22a and the single port 40a which communicates with the actuator chamber 390. If the gage point port 22a to the left of the piston head 36a is placed in communication with the chamber 390, the latter is connected to drain. On the other hand, if a gage point port 22a to the right of the piston head 36a is placed in communication with actuator chamber 390, the latter is placed in communication with the fluid supply line 49a.

Assuming the micrometer valve in the position illustrated in FIG. 22 and a gage point port 22a to the left of the piston head 36a is connected in fluid conducting relation to the actuator chamber 390 which permits this chamber to drain, line 393 admits pressurized fluid against the piston face 389 to move this piston and its rod 386 to the left. This moves the saddle member 8 to the left and in turn moves the outer rod member 24a of the micrometer valve. It carries the helical valving land 36a' on the piston head 36a to the left until this land becomes positioned opposite the vented port 22a, thereby partially closing off communication between the actuator chamber 390 and drain and allowing the pressure to build up in this chamber.

On the other hand, if a particular gage point port 22a to the right of the piston head 36a is opened, actuator chamber 390 is thereby connected to a source of pressurized fluid entering through line 49a. Since the larger actuator piston area 388 is now subjected to fluid at a pressure generally as high as that contacting the smaller area 389 on the other side of this piston, the same moves to the right thereby moving the saddle member 8 to the right. This draws the outer rod member 24a to the right and such rightward movement continues until the helical valving land 36a' partially closes off the particular gage point port 22a which had been selectively placed in communication with the actuator chamber 390 and causing pressure to build up in this chamber.

Leftward or rightward movement of the actuator piston 385 continues until a balance of hydraulic forces on opposite sides of this piston is achieved. Balance is achieved when the pressure of fluid in actuator chamber 390 is half that in actuator chamber 392, since piston area 388 is twice that of piston area 389.

It will be understood, of course, that the inner rod member 23a is connected to a micrometer valve rotary actuator assembly, similar to that disclosed in FIG. 2, for rotating the piston head 36a with the helical valving land 36a' thereon to determine the incremental movement of the outer rod member 24a and hence the saddle member 8, between two adjacent gage point ports 22a.

MODIFICATION OF FIG. 23

Various elements in the embodiment of FIG. 23 correspond to similar elements shown in FIG. 2 and are therefore represented by the same reference numerals except for bearing the subscript "b."

In FIG. 23, the micrometer valve assembly 14b is shown as utilized as a pilot valve operatively associated with a second stage power servovalve assembly 438 which in turn controls the flow of hydraulic fluid with respect to a power actuator 439. As shown, the micrometer valve assembly 14b comprises a cylinder 21b having a plurality of gage point ports 22b provided in the wall thereof. Slidably and rotatably arranged within the cylinder 21b is a piston head 36b suitably fast to an outer rod member 24b. Both ends of this outer rod member 24b extend through the end walls of the cylinder 21b. The right hand end of this outer rod member 24b is shown as being connected by a thrust bearing 25b, 26b to the saddle member 8 so that this rod member is free to rotate with respect to the saddle member but is constrained to move rectilinearly therewith. The other end of the outer rod member 24b is shown as provided with a recess which receives an inner rod member 23b. Both rod members are constrained to rotate together by a pin and slot connection 440 although the outer rod member 24b can slide relative to the inner rod member 23b. The inner rod member 23b is the shaft of the micrometer valve rotary actuator assembly previously described but not illustrated in FIG. 23.

The various gage point ports 22b are operatively associated with a linear selector valve 15b. The single port 40b of the linear selector valve assembly 15b is shown as connected to drain via a fluid conduit or line 441.

The piston head 36b is formed peripherally with a helical valve land 36b' adapted to close any one of the gage point ports 22b. This piston head 36b also divides the interior of the cylinder 21b into a left chamber 27b and a right chamber 47b.

The second stage power servovalve assembly 438 comprises a cylinder 442 in which a valve spool 443 having a center lobe 444, a left end lobe 445, and a right end lobe 446, is slidably arranged. The space between the outer end face of the left end lobe 445 and the corresponding end wall of the cylinder 442 provides a spool end chamber 448. Similarly, a spool end chamber 449 is provided between the outer end face of the right end lobe 446 and the corresponding end wall of the cylinder 442. The left spool end chamber 448 is connected to the left micrometer valve cylinder chamber 27b via a fluid conduit or line 450. Similarly, the right spool end chamber 449 is connected to the right micrometer valve cylinder chamber 47b via a fluid conduit or line 451.

Centering spring means including a helical compression spring 452 arranged in the left spool end chamber 448 and a second helical compression spring 453 arranged in the right end spool chamber 449, constantly urge the servovalve spool 443 toward a centered position with respect to the cylinder 442. When in this centered position, as illustrated in FIG. 23, the center lobe 444 closes off a supply port 454, the left end lobe 445 closes off a drain port 455, and the right end lobe 446 closes off a drain port 456. The drain ports 455 and 456 are connected to drain via a suitable fluid conduit or line 458.

Hydraulic fluid under pressure from any suitable source (not shown) is supplied through a fluid conduit line 459 which communicates with a second fluid conduit or line 460, one end of which is shown as communicating with the pressure port 454 and the other end of which is shown as communicating centrally with a transverse fluid conduit or line 461. The opposite ends of the transverse line 461 communicate severally with the lines 450 and 451. A restriction 462 is shown in the line 461 between the lines 450 and 460, and a similar restriction 463 is shown arranged in the line 461 between the lines 460 and 451.

The power actuator 439 is shown as comprising a cylinder 464 through the end walls of which a piston rod 465 extends and is slidably arranged thereon. This piston rod carries an actuator piston 466 arranged within the cylinder 464. The actuator piston rod 465 is shown as fixedly connected to the saddle member 8. The actuator piston 466 divides the interior of the actuator cylinder 464 into a left chamber 468 and a right chamber 469. The left actuator cylinder chamber 468 is shown as connected in fluid conducting communication with the annular space between the center lobe 444 and the left end lobe 445 of the servovalve spool 443, via a fluid conduit or line 470. Similarly, the right actuator cylinder chamber 469 is connected in fluid conducting communication with the annular space between the center lobe 444 and the right end lobe 446 of the servovalve spool 443, via a fluid conduit or line 471.

In describing the operation of the system shown in FIG. 23, let it be assumed initially that the various elements are in their respective positions illustrated. Consider now that a gage point port 22b to the left of the piston head 36b is selectively connected to drain by the appropriate actuation of the linear selector valve assembly 15b. In other words, a gage point port 22b to the left of the piston head 26b is connected to fluid drain via the line 441. This will cause pressure in the left micrometer valve cylinder chamber 27b, and in the left spool end chamber 448 of the power servovalve assembly, to drop to some very low value. At this time, the pressure in the right micrometer valve cylinder chamber 47b, which is connected to the right spool end chamber 449 of the power servovalve assembly, will rise to system supply pressure since its only connection is to pressure through the supply orifice 463. The pressure differential thus created across the servovalve spool 443 will move this spool to the left against the urging of the centering springs 448 and 449. This leftward motion of the servovalve spool will place the supply port 454 in communication with the right actuator line 471, and will also place the drain port 455 in communication with the left actuator line 470. Thus, the right actuator cylinder chamber 469 is connected to supply pressure and the left actuator cylinder chamber 468 is connected to drain, resulting in motion of the actuator piston 466 to the left. This moves the saddle member 8 to the left and also the valving land 36b'.

As the actuator piston 466 moves, the piston head 36b will displace a volume of fluid from the left micrometer valve cylinder chamber 27b. This will create an additional flow which is removed from this chamber 27b through the particular gage point port 22b which has been vented or connected to drain. This flow, through restriction of the gage point port, will cause some increase in the pressure in the chamber 27b. Similarly, the increasing volume created for the right micrometer valve cylinder chamber 47b will require a flow through the supply orifice 463, resulting in a marked decrease in pressure on the downstream side of this orifice 463. This decreased pressure is also present in the interconnected chambers 47b and 449. This change in pressure appears as a reduced differential pressure acting on the servovalve spool 443 and therefore appears as a stabilizing velocity feedback.

When the valving land 36b' reaches a position where it is centered over the selected gage point port 22b that had been vented, equivalent leakage paths to drain will be created on both sides of this valving land. These, in conjunction with the equal supply orifices 462 and 463, will cause the pressures in the micrometer valve cylinder chambers 27b and 47b, and also the respectively connected spool end chambers 448 and 449, to become equal, thus reducing the differential pressure on the servovalve spool 443 to zero. The servovalve will therefore be closed by action of the centering springs 452 and 453, cutting off flow of hydraulic fluid to the power actuator assembly 459 and bringing the saddle member 8 to rest.

Alternately, it is apparent that when a gage point port 22b to the right of the piston head 36b is connected to drain through selective actuation of the linear selector valve assembly 15b, the saddle member 8 will be caused to move to the right as viewed in FIG. 23.

An advantage of the system shown in FIG. 23 is its high positional sensitivity whereby a very slight misalinement of the valving land 36b' with a gage point port 22b will cause a large change in fluid flow with respect to the power actuator 439. Another advantage is that by using a four-way valve and balanced areas on the actuator piston 466, the apparatus can be provided in compact form.

While the valving land illustrated and described in connection with each of the forms of the invention illustrated in FIGS. 2, 22 and 23 has been helical, as is presently preferred, it will be appreciated by those skilled in the art that any suitably shaped or contoured type of valving land may be employed which extends arcuately in a circumferential direction and is bounded by an edge varying positionally in an axial direction along the effective arcuate extent of the land. For example, since the micrometer valve rotary actuator assembly 18 moves the inner rod member 23 to any one of one hundred finite positions, the valving land may have an edge with one hundred steps arranged throughout its effective arcuate extent.

It will also be seen that the micrometer valve assembly 14, 14a or 14b in the various embodiments illustrated, operates as a three-way valve and the piston head with the valving land thereon acts as a valve spool.

It will also be understood that while the invention has been described in connection with positioning saddle and table members of machine tools, it is not to be considered as limited to this application but is generally adapted to move any member which requires controlled positioning.

Various further modifications will be readily apparent to those skilled in the art so that the embodiments shown and described herein are illustrative and not limitative of the invention which is to be measured by the scope of the appended claims.

What is claimed is:

1. In a positioner for a movable member, the combination comprising fluid operated actuator means for moving said member, and means controlling flow of fluid with respect to said actuator means and including a body element provided with a plurality of gage point ports, a slide element operatively associated with said body element, said elements being arranged to have relative rotative movement in a circular direction and relative sliding movement in a transverse direction, said slide element having a valving land extending arcuately in said circular direction and bounded by an edge varying positionally in said transverse direction along the effective arcuate extent of said land, said valving land being adapted to traverse any one of said ports, selector valve means operatively associated with said body element and selectively operable to place any and at least one of said ports in fluid conducting communication with said actuator means, said body and slide elements moving in said transverse direction relative to each other in response to movement of said member, and means selectively operable to produce the desired relative movement in said circular direction between said body and slide elements.

2. In a positioner for a rectilinearly movable member, the combination comprising fluid operated actuator means for moving said member rectilinearly, and means controlling flow of fluid with respect to said actuator means and including valve means having a valve body provided with a plurality of gage point ports and a rotatable valve slide having an arcuate valving land bounded by an edge varying positionally in the direction of relative sliding movement between said valve body and slide along the effective arcuate extent of said land, said valving land being adapted to traverse any one of said ports, selector valve means operatively associated with said first-mentioned valve means and selectively operable to place any and at least one of said ports in fluid conducting communication with said actuator means, said valve body and slide moving rectilinearly relative to each other in response to rectilinear movement of said member, and means selectively operable to produce the desired relative rotative movement between said valve body and slide.

3. In a positioner for a rectilinearly movable member, the combination comprising fluid operated actuator means for moving said member rectilinearly, and means controlling flow of fluid with respect to said actuator means and including valve means having a valve body provided with a plurality of gage point ports and a rotatable valve slide having a helical valving land, said valving land being adapted to traverse any one of said ports, selector valve means operatively associated with said first mentioned valve means and selectively operable to place any and at least one of said ports in fluid conducting communication with said actuator means, said valve body and slide moving rectilinearly relative to each other in response to rectilinear movement of said member, and means selectively operable to produce the desired relative rotative movement between said valve body and slide.

4. In a positioner for a movable member, the combination comprising fluid operated actuator means for moving said member, and means controlling flow of fluid with respect to said actuator means and including a body element, a slide element, said elements being operatively associated and being arranged to have relative rotative movement in a circular direction and relative sliding movement in a transverse direction, said body element having a plurality of gage point ports arranged at predetermined and uniformly spaced intervals along said transverse direction, said slide element having a valving land extending arcuately in said circular direction and bounded by an edge varying positionally in said transverse direction along the effective arcuate extent of said land, the maximum offset in said transverse direction between the ends of said arcuate extent of said land corresponding to one of said intervals, selector valve means operatively associated with said body element and selectively operable to place at least one of said ports in fluid conducting communication with said actuator means, said body and slide elements moving in said transverse direction relative to each other in response to movement of said member, and means for effecting relative movement in said circular direction between said body and slide elements.

5. In a positioner for a rectilinearly movable member, the combination comprising fluid operated actuator means for moving said member rectilinearly, and means controlling flow of fluid with respect to said actuator means and including valve means having a valve body provided with a plurality of gage point ports arranged at predetermined and uniform longitudinally spaced intervals and a relatively rotatable valve slide including a helical land having a lead through its effective arcuate extent corresponding to one of said intervals, selector valve means operatively associated with said first mentioned valve means and selectively operable to place at least one of said ports in fluid conducting communication with said actuator means, said valve body and slide moving rectilinearly relative to each other in response to rectilinear movement of said member, and means for rotating said slide relative to said body.

6. In a positioner for a rectlinearly movable member, the combination comprising fluid operated actuator means for said member, micrometer valve means including a slidable and rotatable valve element operatively connected to said member and arranged to traverse a plurality of gage point ports, first selector valve means for operatively connecting the desired one of said ports in fluid conducting relation with said actuator means, and rotary actuator means arranged to rotate said element.

7. In a positioner for a rectilinearly movable member, the combination comprising fluid operated actuator means for said member, micrometer valve means including a valve body having a chamber the wall of which is provided with a plurality of normally-closed gage point ports severally operatively associated with said actuator means and also including a valve element operatively connected to said member and slidably and rotatably arranged in said chamber to traverse said ports, means for selectively opening at least one of said ports to establish fluid conducting communication between said actuator means and chamber on one side of said element, the portion of said chamber on one side of said element being connected to a supply of pressurized fluid and the portion of said chamber on the other side of said element being connected to a fluid return, and rotary actuator means arranged to rotate said element.

8. In a positioner for a movable member, the combination comprising a valve body element provided with spaced gage point ports having a uniform center-to-center spacing, a valve slide element including a helical land adapted to traverse any one of said ports, said land having a lead through its effective arcuate extent corresponding to said center-to-center spacing, means for moving said elements axially relative to each other in response to movement of said member, and means selectively operable to produce relative rotative movement between said elements.

9. In a positioner for a movable member, the combination comprising fluid operated actuator means for moving said member, three-way valve means operatively associated with said actuator means and member, said valve means including a valve body having a series of axially spaced gage point ports, and means for selectively connecting any one of said ports in fluid conducting relation with said actuator means, said valve means also including a valve slide having a land movable by said member to a nulled position on said one of said ports.

10. In a positioner for a movable member, the combination comprising fluid operated actuator means for said member and including two oppositely facing surfaces, and three-way valve means for selectively controlling the effect of opposed fluid forces against said surfaces to move said member in opposite directions and including means providing a plurality of gage point ports, selector valve means for connecting one of said surfaces in fluid conducting relation with any one of said ports and means operatively connected to and movable by said member for closing said one of said ports.

11. In a positioner for a movable member, the combination comprising fluid operated actuator means having two fluid-contacting surfaces of different areas and facing in opposite directions, and three-way valve means including a valve body having a chamber one end of which is connected to a supply of fluid under pressure and the other end of which is connected to drain, said valve body being provided with a series of gage point ports any one of which is selectively connectable with one of said surfaces, and a port closure operatively connected to said member and movable thereby to a nulled position on the selected one of said ports.

12. In a positioner for a movable first member, the combination comprising a second member, a third member movable with said first member and with respect to said second member and internally formed with a recess having a fluid-contacting surface and receiving said second member and forming an actuator chamber, a piston head on said third member and having an end face, said surface and face facing in opposite directions and the area of said surface being larger than that of said face, a cylinder surrounding said piston head and in which the same is slidable and having end walls through one of which said third member extends, the portion of said cylinder between said head and one end wall providing a pressure chamber which is connected to a supply of fluid under pressure, the portion of said cylinder between said head and the other of said end walls providing a drain chamber connected to fluid drain, said cylinder being provided with a series of axially and uniformly spaced gage point ports, said piston head having an axial width corresponding to the maximum axial dimension of one of said ports, and means for selectively connecting in fluid conducting communication any one of said ports with said actuating chamber.

13. In a positioner for a movable first member, the combination comprising a rotative but axially immovable second member, a rotative and axially movable third member constrained to move axially with said first member but free to rotate relative thereto, said third member being internally formed with a recess receiving said second member for relative sliding movement and forming jointly therewith an actuating chamber having an axially facing fluid-contacting surface, means preventing relative rotation between said second and third members, a piston head on said third member and having a helical valving land and also an end face which faces in the opposite axial direction from said surface, the area of said surface being twice that of said face, a cylinder surrounding said piston head and in which the same is slidable and having end walls through one of which said third member extends and through the other of which said second member extends, the portion of said cylinder between said head and one end wall providing a pressure chamber which is connected to a supply of fluid under pressure, the portion of said cylinder between said head and said other end wall providing a drain chamber connected to fluid drain, said cylinder being provided with a series of axially and uniformly spaced gage point ports, said valving land having a width corresponding to the transverse dimension of one of said ports and having a lead through its effective arcuate extent corresponding to such center-to-center spacing, means for selectively connecting in fluid conducting communication any one of said ports with said actuating chamber, and means for selectively rotating said second member through the desired angular increment.

14. In a positioner for a movable member, the combination comprising a fluid operated actuator having a movable element operatively connected to said member, one fluid-contacting side of said element having a larger exposed area than its opposite fluid-contacting side, said actuator on said opposite side of said element being connected to a supply of fluid under pressure, and three-way valve means including a valve body having a chamber one end portion of which is connected to a supply of fluid under pressure and the other end portion of which is connected to drain, said valve body being provided with a series of gage point ports any one of which is selectively connectable in fluid conducting relation with said actuator on said one side of said element, and a port closure operatively connected to said member and movable thereby to a nulled position on the selected one of said ports.

15. In a positioner for a rectilinearly movable member, the combination comprising a fluid operated actuator having a movable element operatively connected to said member, one fluid-contacting side of said element having a larger exposed area than its opposite fluid-contacting side, said actuator on said opposite side of said element being connected to a supply of fluid under pressure, three-way valve means including a valve body having a chamber and a valve spool axially slidably and rotatably arranged therein, the end portion of said chamber on one side of said spool being connected to a supply of fluid under pressure and the end portion of said chamber on the opposite side of said spool being connected to drain, said valve body being provided with a series of uniformly and longitudinally spaced gage point ports, selector means for connecting the desired one of said ports in fluid conducting relation with said actuator on said one side of said element, said spool having a helical land of a width corresponding to the transverse dimension of one of said ports and having a lead through its effective arcuate extent corresponding to such center-to-center spacing, means for rotating said spool selectively through a desired angular increment, and means for operatively connecting said spool to said member to permit relative rotation therebetween but to constrain said spool to move rectilinearly with said member.

16. In a positioner for a rectilinearly movable member, the combination comprising fluid operated actuator means for moving said member rectilinearly and including cylinder and piston elements one of which is operatively connected to said member and providing chambers on opposite sides of said piston element, means for supplying pressurized fluid to one of said chambers, and valve means for controlling flow of fluid with respect to the other of said chambers and including valve body and slide elements one of which is constrained to move rectilinearly with said member, said valve body element having a plurality of axially spaced gage point ports, means for supplying pressurized fluid to one end of said valve body element and venting the other end, first selector means for connecting the desired one of said ports in fluid conducting relation with said other of said chambers and second selector means for effecting the desired degree of relative rotation between said valve body and valve slide elements.

17. In a pneumatic-hydraulic point-to-point positioner for a rectilinearly movable member, hydraulic fluid operated actuator means for said member and having two hydraulic fluid-contacting surfaces facing in opposite directions, and means for selectively developing opposed hydraulic forces against said surfaces to move said member in said opposite directions and including flow control valve means operatively associated with said actuator means and having a valve body element provided with a plurality of gage point ports and a movable port closure element arranged to traverse said ports and having an effective width corresponding to one of said ports, one of such valve elements being constrained to move rectilinearly with said member, and pneumatic fluid controlled selector valve means arranged to open only the desired one of said ports at a time.

18. In a pneumatic-hydraulic point-to-point positioner for a rectilinearly movable member, hydraulic fluid operated actuator means for said member and having two hydraulic fluid-contacting surfaces facing in opposite directions, and means for selectively developing opposed hydraulic forces against said surfaces to move said member in opposite directions and including flow control valve means operatively associated with said actuator means and having a valve cylinder the wall of which is provided with a plurality of gage point ports and an axially slidable and rotatable spool having a helical land arranged to traverse said ports, said spool being constrained to move rectilinearly with said member but being permitted rotative movement relative thereto, pneumatic fluid controlled selector valve means operatively associated with said ports to control selectively the opening and closing thereof, rotary actuator means for rotating said spool and including an actuator body element provided with a plurality of gage point ports and an actuator closure element movable with respect to the last-mentioned ports, one of said rotary actuator elements being operatively connected to said spool, and second pneumatic fluid controlled selector valve means operatively associated with said last mentioned ports to control selectively the opening and closing thereof.

19. Pneumatic-hydraulic digital-to-analog positioning apparatus, comprising hydraulic fluid operated power actuator means, micrometer valve means for controlling flow of hydraulic fluid with respect to said power actuator means and including coarse gage point ports and a slidable and rotatable spool having a helical land operatively associated with said coarse ports, first selector valve means operatively associated wit said coarse ports and power actuator means and including hydraulic fluid operated movable elements selectively operable for opening one of said coarse ports while keeping the others closed, hydraulic fluid operated micrometer rotary actuator means for rotating said spool and including fine gage point ports and a movable closure operatively associated with said fine ports, second selector valve means operatively associated with said fine ports to control movement of said closure and including hydraulic fluid operated movable elements selectively operable for opening one of said fine ports while keeping the others closed, and tape controlled pneumatic fluid operated means operatively associated with said elements to control hydraulic actuation thereof.

20. Pneumatic-hydraulic digital-to-analog positioning apparatus, comprising hydraulic fluid operated power actuator means, micrometer valve means for controlling flow of hydraulic fluid with respect to said power actuator means and including coarse gage point ports and a slidable and rotatable spool having a helical land operatively associated with said coarse ports, first selector valve means operatively associated with said coarse ports and power actuator means and including hydraulic fluid operated movable elements selectively operable for opening one of said coarse ports while keeping the others closed, hydraulic fluid operated micrometer rotary actuator means for rotating said spool and including fine gage point ports and a movable closure operatively associated with said fine ports, second selector valve means operatively associated with said fine ports to control movement of said closure and including hydraulic fluid operated movable elements selectively operable for opening one of said fine ports while keeping the others closed, tape reader means including a pneumatic fluid-filled chamber for each of said movable elements, and pneumatic-to-hydraulic transducer means operatively associated with the corresponding ones of said chambers and elements, the internal pressures of said chambers being controlled severally by a tape bearing the digital information.

21. Numerical positioning apparatus, comprising fluid operated power actuator means, micrometer valve means for controlling flow of fluid with respect to said power actuator means and including coarse gage point ports having a center-to-center spacing of one tenth of an inch and also including a slidable and rotatable spool having a helical land operatively associated with said coarse ports, said land having a lead through its effective arcuate extent corresponding to said center-to-center spacing, said coarse ports being singly and selectively operatively associated with said power actuator means, and fluid operated micrometer rotary actuator means for rotating said spool and including an arcuate chamber having one hundred equally and circumferentially spaced fine gage point ports and also including a movable vane providing a closure for any one of said fine ports and operatively associated with said spool, said fine ports singly and selectively controlling flow of fluid with respect to said rotary actuator means.

22. In a positioner for a movable member, the combination comprising fluid operated actuator means for moving said member, first stage pilot valve means including a cylinder and valve spool movably arranged therein and dividing said cylinder into end chambers, said pilot valve cylinder having a plurality of gage point ports, said pilot valve spool having a valving land for closing one of said ports and being movable with said member, second stage servovalve means including a cylinder and a valve spool movably arranged therein and providing spool end chambers at opposite ends of said servovalve spool, said pilot valve end chambers being connected severally in fluid conducting communication with said servovalve spool end chambers, said second stage servovalve means being operatively associated with said actuator means for controlling the flow of fluid with respect thereto, and selectively operable means for venting the desired one of said ports.

23. In a positioner for a movable member, the combination comprising fluid operated actuator means for moving said member, first stage three-way valve means including a valve body element provided with an end port at each of its opposite ends and a plurality of gage point ports intermediate such end ports and a valve slide element movable with said member and adapted to close internally any one of said gage point ports, selectively operable means for closing externally all but one of said gage point ports, second stage four-way servovalve means for controlling flow of fluid with respect to said actuator means and including a movable valve spool, and means establishing fluid conducting connections of said end ports severally with opposite ends of said valve spool.

References Cited in the file of this patent

UNITED STATES PATENTS

| | | |
|---|---|---|
| 752,491 | Warren | Feb. 16, 1904 |
| 1,004,541 | Martin | Sept. 26, 1911 |
| 1,169,090 | Lucke | Jan. 18, 1916 |
| 1,484,030 | Kitchen | Feb. 19, 1924 |
| 1,841,629 | Pigeolot | Jan. 19, 1932 |
| 2,244,296 | Heinrich et al. | June 3, 1941 |
| 2,626,594 | Kimmell | Jan. 27, 1953 |
| 2,703,149 | Nelson | Mar. 1, 1955 |
| 2,898,890 | Lynott | Aug. 11, 1959 |
| 2,935,089 | Christie | May 30, 1960 |
| 2,948,298 | Gardner | Aug. 9, 1960 |
| 2,976,843 | Weibel | Mar. 28, 1961 |
| 2,992,633 | Stiglic et al. | July 18, 1961 |

FOREIGN PATENTS

| | | |
|---|---|---|
| 662,771 | Germany | July 21, 1938 |
| 464,891 | Great Britain | Apr. 27, 1937 |